(12) United States Patent  
Marumoto

(10) Patent No.: US 8,477,361 B2  
(45) Date of Patent: Jul. 2, 2013

(54) IMAGE DATA GENERATING APPARATUS AND IMAGE DATA GENERATING METHOD FOR GENERATING IMAGE DATA WHEN AN IMAGE IS PRINTED IN A DIVIDED MANNER

(75) Inventor: Yoshitomo Marumoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1274 days.

(21) Appl. No.: 11/951,966

(22) Filed: Dec. 6, 2007

(65) Prior Publication Data

US 2008/0137146 A1    Jun. 12, 2008

Related U.S. Application Data

(63) Continuation of application No. PCT/JP2007/066670, filed on Aug. 28, 2007.

(30) Foreign Application Priority Data

Aug. 28, 2006    (JP) .................................. 2006-231152

(51) Int. Cl.  
*G06K 15/02*    (2006.01)

(52) U.S. Cl.  
USPC .......................................................... 358/1.2

(58) Field of Classification Search  
None  
See application file for complete search history.

(56) References Cited

U.S. PATENT DOCUMENTS

| | | | |
|---|---|---|---|
| 5,111,310 A | 5/1992 | Parker et al. | |
| 5,323,247 A | 6/1994 | Parker et al. | |
| 5,341,228 A | 8/1994 | Parker et al. | |
| 5,726,772 A | 3/1998 | Parker et al. | |
| 5,949,965 A * | 9/1999 | Gondek | 358/1.9 |
| 5,956,467 A * | 9/1999 | Rabbani et al. | 358/1.9 |
| 5,973,803 A | 10/1999 | Cheung et al. | |
| 6,089,691 A | 7/2000 | Kakutani | |
| 6,099,105 A | 8/2000 | Kakutani | |
| 6,154,233 A * | 11/2000 | Breswick | 347/40 |
| 6,363,172 B1 | 3/2002 | Cheung et al. | |

(Continued)

FOREIGN PATENT DOCUMENTS

| | | |
|---|---|---|
| JP | 8-279920 | 10/1996 |
| JP | 2622429 | 4/1997 |

(Continued)

OTHER PUBLICATIONS

R.Floyd, et al. "An Adaptive Algorithm for Spatial Grey Scale" SID Int'l Symposium Digest of Technical Papers, pp. 36-37, 1975.

(Continued)

*Primary Examiner* — Jeremiah Bryar  
(74) *Attorney, Agent, or Firm* — Fitzpatrick, Cella, Harper & Scinto

(57) ABSTRACT

The generation of dot data of planes depending on a plurality of scannings and ink colors in an ink jet printing apparatus is performed based on the error diffusion processing for each plane without causing a problem of grain. Specifically, in a binarization processing, C divided data $D8c/2$ is subjected to an error diffusion processing to calculate binary (dot) data $D2c1$ for the first pass of C. Next, M divided data $D8m/2$ is compensated by being added with a term of $Kc1m1(D8c/2-D2c1)$. Then, this compensated data $[D8m/2+Kc1m1(D8c/2-D2c1)]$ is subjected to an error diffusion processing to calculate dot data $D2m1$ for the first pass of M. In this manner, the generation of the respective planes performs correction to reflect the results of the binarization processing of the respective previously processed planes to subject the compensated data to an error diffusion processing.

17 Claims, 19 Drawing Sheets

U.S. PATENT DOCUMENTS

| | | |
|---|---|---|
| 2003/0025749 A1 | 2/2003 | Krouss |
| 2007/0097164 A1 | 5/2007 | Marumoto |
| 2007/0109604 A1 | 5/2007 | Marumoto |
| 2008/0049057 A1 | 2/2008 | Ochiai et al. |

FOREIGN PATENT DOCUMENTS

| | | |
|---|---|---|
| JP | 11-10918 | 1/1999 |
| JP | 11-010918 A | 1/1999 |
| JP | 2001-150700 | 6/2001 |
| JP | 2001-150700 A | 6/2001 |
| JP | 3208777 | 7/2001 |
| JP | 2001-298617 | 10/2001 |
| JP | 2006-44258 | 2/2006 |
| JP | 2006-256260 | 9/2006 |

OTHER PUBLICATIONS

Communication re European Patent Appln. No. 07806148.8, European Patent Office, Apr. 5, 2012.

Office Action issued in Japanese Patent Office Application No. 2008-208216 on Feb. 3, 2012.

* cited by examiner

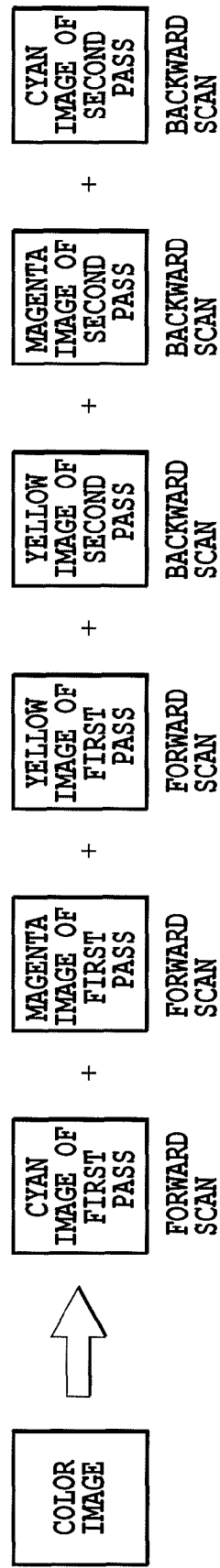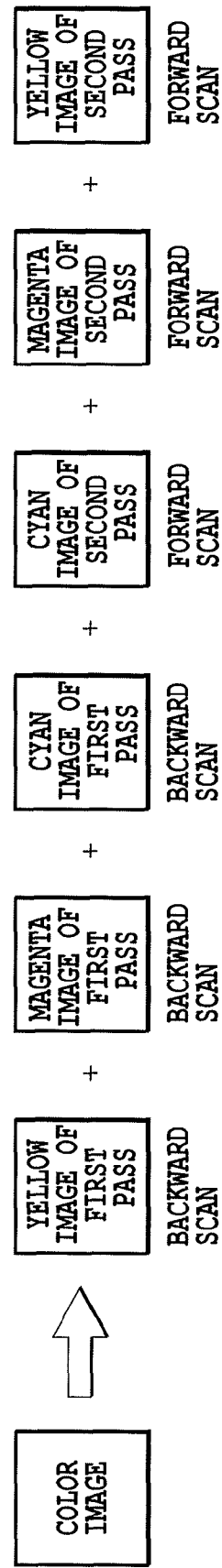

FIG.9A $D_c^8/2$

| 100 | 100 | 100 | 100 |
|---|---|---|---|
| 100 | 100 | 100 | 100 |
| 100 | 100 | 100 | 100 |
| 100 | 100 | 100 | 100 |

FIG.9B 801 — $D_c^2 1$

| 255 | 0 | 0 | 255 |
|---|---|---|---|
| 0 | 0 | 255 | 0 |
| 255 | 0 | 0 | 0 |
| 0 | 255 | 0 | 255 |

FIG.9C 801 — $D_c^8/2 - D_c^2 1$

| -155 | 100 | 100 | -155 |
|---|---|---|---|
| 100 | 100 | -155 | 100 |
| -155 | 100 | 100 | 100 |
| 100 | -155 | 100 | -155 |

FIG.9D $Kc1m1(D_c^8/2 - D_c^2 1)$

| -77.5 | 50 | 50 | -77.5 |
|---|---|---|---|
| 50 | 50 | -77.5 | 50 |
| -77.5 | 50 | 50 | 50 |
| 50 | -77.5 | 50 | -77.5 |

FIG.9E $D_m^8/2$

| 100 | 100 | 100 | 100 |
|---|---|---|---|
| 100 | 100 | 100 | 100 |
| 100 | 100 | 100 | 100 |
| 100 | 100 | 100 | 100 |

FIG.9F $D_m^8/2 + Kc1m1(D_c^8/2 - D_c^2 1)$

| 22.5 | 150 | 150 | 22.5 |
|---|---|---|---|
| 150 | 150 | 22.5 | 150 |
| 22.5 | 150 | 150 | 150 |
| 150 | 22.5 | 150 | 22.5 |

FIG.9G 801 — $D_m^2 1$

| 0 | 255 | 0 | 0 |
|---|---|---|---|
| 255 | 0 | 0 | 255 |
| 0 | 255 | 255 | 0 |
| 255 | 0 | 0 | 0 |

| 80 | 222 | 191 | 73 |
|---|---|---|---|
| 113 | 137 | 23 | 121 |
| 5 | 170 | 252 | 106 |
| 248 | 13 | 154 | 96 |

$D_{c1}^2 \cup D_{m1}^2 (K_{c1m1} = 0.3)$ $D_{c1}^2 \cup D_{m1}^2 (Kc1m1 = 0)$ $D_{c1}^2 \cup D_{m1}^2(K_{c1m1} = 0.3) \cup D_{y1}^2(K_{c1y1} = K_{m1y1} = 0.3)$

| 193 | 244 | 48 | 211 |
|-----|-----|-----|-----|
| 92 | 150 | 71 | 237 |
| 25 | 177 | 16 | 125 |
| 181 | 229 | 107 | 191 |

FIG.18

| 100 | 100 | 100 | 100 |
|---|---|---|---|
| 100 | 100 | 100 | 100 |
| 100 | 100 | 100 | 100 |
| 100 | 100 | 100 | 100 |

FIG.19A

| 255 | 0 | 0 | 255 |
|---|---|---|---|
| 0 | 255 | 0 | 0 |
| 0 | 0 | 0 | 255 |
| 255 | 0 | 255 | 0 |

FIG.19B

| 100 | 100 | 100 | -155 |
|---|---|---|---|
| 100 | -155 | 100 | 100 |
| 100 | 100 | 100 | -155 |
| -155 | 100 | -155 | 100 |

FIG.19C

| 50.0 | 50.0 | 50.0 | -77.5 |
|---|---|---|---|
| 50.0 | -77.5 | 50.0 | 50.0 |
| 50.0 | 50.0 | 50.0 | -77.5 |
| -77.5 | 50.0 | -77.5 | 50.0 |

FIG.19D

| 100 | 100 | 100 | 100 |
|---|---|---|---|
| 100 | 100 | 100 | 100 |
| 100 | 100 | 100 | 100 |
| 100 | 100 | 100 | 100 |

FIG.19E

| 150.0 | 150.0 | 150.0 | 22.5 |
|---|---|---|---|
| 150.0 | 22.5 | 150.0 | 150.0 |
| 150.0 | 150.0 | 150.0 | 22.5 |
| 22.5 | 150.0 | 22.5 | 150.0 |

FIG.19F

| 0 | 0 | 255 | 0 |
|---|---|---|---|
| 255 | 0 | 255 | 255 |
| 0 | 255 | 0 | 0 |
| 0 | 255 | 0 | 0 |

FIG.19G ial field of image data generating apparatus, an image printing apparatus, and an image data generating method. In particular, the present invention relates to the generation of image data used when an image to be printed in a unit area of a printing medium is formed in a divided manner by a plurality of scans of a printing head or by a plurality of printing heads for printing the same color.

BACKGROUND ART

With the diffusion of information processing devices such as personal computers, printing apparatuses as an image formation terminal also have been widely used. In particular, an ink jet printing apparatus in which ink is ejected from ejection openings to perform a print on a paper or the like has advantages that this apparatus is an non impact type one and uses a printing method causing low noise, this apparatus can perform a printing operation with a high density and a high speed, and this apparatus can easily cope with a color printing, for example. Thus, the ink jet printing apparatus has been increasingly used as a printing apparatus for personal use.

The ink jet printing techniques are widely used as described above and thus have been required to provide a further improved quality of a printed image. In recent years, many print systems for family use that can perform photo printing are available and thus a printed image has been required to have a visual quality equal to that by silver halide photography. In the comparison with silver halide photography, one problem of a granular texture caused in a printed image has been conventionally found. Thus, various structures for reducing this granular texture have been provided.

For example, an ink jet printing apparatus has been known in which, in addition to usual inks of cyan, magenta, yellow, and black, ink of light cyan and light magenta having a lower concentration of color material such as dye is used. This ink jet printing apparatus can use light cyan or light magenta ink in a region having a low printing density to reduce a granular texture. For a region having a high density, cyan or magenta ink having a normal concentration can be used to realize a broader color reproduction range and a smooth tone change.

There is another method for reducing the granular texture by reducing the size of dots formed on a printing medium. In order to realize this method, a technique for reducing an amount of ink droplets ejected from printing heads also has been developed. In this case, in addition to the reduction of an amount of ink droplets, a high-resolution image also can be obtained without lowering the printing speed by arranging more ejection openings with a higher density.

In addition to the technique for reducing the granular texture by focusing on ink to be used, an image processing technique also has been known by focusing on the area coverage modulation method. An ink jet printing apparatus determines whether dots are formed or not with regards to pixels corresponding to a printing resolution to perform a printing based on this determination. For this dot formation, multi-valued image data having predetermined density information is subjected to a quantization processing and is finally converted to binary data. Specifically, a density or tone of an area in a printed image having a size that is macroscopically observed is represented by the number of printed dots and an arrangement thereof. Such a representation of density and tone is generally called as an area coverage modulation. In the area coverage modulation method, a same density can be represented by various dot arrangements. For example, a dot arrangement by the error diffusion method has been known as described in the paper by R. Flold and L. Steinberg titled "Adaptive Algorithm for Spatial Grey Scale" (SDI Int'l Sym. Digest of Tech. papers, 36 to 37 pages (1975)). As a method other than the error diffusion method, a dot arrangement by the ordered dither method also has been known as disclosed in Japanese Patent No. 2,622,429 and Japanese Patent Laid-Open No. 2001-298617. According to these methods, an arrangement of formed dots is visually preferable for which the dispersibility is good and less low frequency components are caused in the space frequency.

Meanwhile, the so-called serial type apparatus in the ink jet printing apparatus widely uses a multi-pass printing method. It is noted that the terms "pass" and "scanning" have the same meaning.

FIG. 1 is a diagram for illustrating the multi-pass printing and schematically showing a printing head and printed dot patterns. In FIG. 1, P0001 denotes a printing head. For simplification of explanation, a printing head is illustrated as having sixteen ejection openings (hereinafter also referred to as nozzles). As shown, a nozzle column is used by being divided to four of the first to fourth nozzle groups each of which includes four nozzles. P0002 denotes a mask pattern in which mask pixels for which a printing is permitted correspondingly to the respective nozzles (print permitting pixels) are shown with black. Mask patterns corresponding to four nozzle groups have complementary relations to each other, and therefore a pattern made by superposing the four mask patterns has 4×4 pixels which are all print permitting pixels. In other words, the four mask patterns are used to complete the printing of a 4×4 area.

P0003 to P0006 denote arrangement patterns of dots to be formed and show how an image is completed by repeating a printing scan. It is noted that the example shown in FIG. 1 shows a case where a so-called solid image is printed in which dots are formed on all of 4×4 pixels. As shown in dot arrangement patterns for the respective scans, a multi-pass printing causes each printing scan to form dots based on binary image data (dot data) generated by using a mask pattern corresponding to each nozzle group. Every time the printing scan is completed, a printing medium is conveyed in a direction shown by the arrow by an amount of a width of one nozzle group. In this manner, an image of each region of the printing medium corresponding to the width of one nozzle group is formed with four times of printing scans.

The multi-pass printing as described above can reduce unevenness of density due to variation in directions and amounts of ink ejection from a plurality of nozzles that may be caused due to manufacture processes and due to errors in a paper conveying operation performed between printing scans to an inconspicuous level.

It is noted that the description with reference to FIG. 1 is related to a four-pass printing as an example in which a single image region is subjected to four printing scans. However, the multi-pass printing itself is not limited to this. Other configurations also may be used such as a two pass printing for completing an image by two times of printing scan, a three pass printing for completing an image by three times of printing scan, or other printings for completing an image by five or more printing scans.

In the multi-pass printing, an arrangement of print permitting pixels of a mask pattern may be changed so that the number of dots printed in the respective printing scan operations can be adjusted and the frequency at which at which a nozzle easily causing problems is used for printing can be reduced. Tat is, in addition to the above elimination of uneven densities or stripe-like density unevenness, other modes can be used depending on various objectives.

As described above, ink jet printing systems in recent years can use various types of inks, execution of multi-pass printing, and a preferred area coverage modulation (binarization method) to output a high-quality and stable image with a high speed.

DISCLOSURE OF THE INVENTION

However, according to the examination by the inventor of the present application, with recent ink jet printing systems having a higher speed, a higher print density, and an increased number of types of inks, a new problem that has not been aware is found. The higher speed, the higher print density, and the increased number of types of inks cause an increased amount of ink applied to a unit area of a printing medium per unit of time. In this case, some printing media cannot cope with a speed at which ink is applied thereto even when the printing media can absorb all ink applied thereto. Specifically, even when all ink applied to a printing media is finally absorbed by the printing medium to prevent a problem of fixing or smearing from occurring, ink droplets not yet absorbed at the surface of the printing medium in the midstream of a printing operation have a contact to one another to cause problems in subsequent images.

For example, a case will be considered in which a blue image represented by cyan ink and magenta ink is printed by a two pass of multi-pass printing. Many serial-type ink jet printing apparatus are structured so that printing heads of basic four colors of cyan, magenta, yellow, and black are arranged along the main scanning direction so as to be parallel to one another. Thus, a single printing scan applies the respective colors of inks to an identical region of a printing medium. Specifically, in the above case, ink based on cyan data and magenta data obtained by thinning out dot data of cyan and magenta to be ½ is applied to a printing medium with a very short time difference in an identical printing scan. In this case, when the applied cyan and magenta inks are located close to one another such as when they are applied to the same pixels or neighboring pixels, these droplets attract to one another by the surface tension to form a large dot of two or more droplets (hereinafter referred to as grain). Once such a grain is formed, ink applied to the neighborhood of the grain tends to be attracted by the grain. Specifically, the firstly-generated grain functions as a core to gradually grow to finally form a large grain. Such a grain frequently appears mainly in a high density region to which great amounts of ink are applied. When such a grain occurs in a uniform image region, the grain is recognized as irregularly dispersing, causing an image degradation of the so-called beading.

The above grain phenomenon is basically caused when a plurality of inks are applied to adjacent locations to one another within a relatively short time and the degree at which the ink is attracted to one another depends on the surface tension of the inks. However, the grain is formed not only by the surface tension of the inks as described above. For example, grain is also formed when ink and liquid that coagulates the ink by the reaction with the ink are applied in an identical scanning, the respective liquid and ink contact with one another by a stronger chemical reaction.

Grain is also caused when inks of the same color are applied in a single scanning such as when two nozzle columns are used for a printing for the same color of ink. Furthermore, some absorption characteristic of ink to a printing medium also causes the grain when inks of different colors or same colors of inks applied in different scans of the multi-pass printing are applied close to one another.

One cause of the grain generating dot arrangement in which dots are arranged close to one another is an interference of a mask pattern for a multi-pass with image data.

FIGS. 2A to 2D are diagrams for illustrating the interference. FIG. 2A shows a pattern of cyan binary image. FIG. 2B shows a mask pattern of a first pass (50% is print permitting pixels) of cyan mask patterns for two pass printing. In FIG. 2A, the binary image data has a size of 4×4 while FIG. 2B shows a mask pattern in which print permitting pixels having a size of 4×4 are arranged to correspond to a pattern of binary image data.

In this case, a dot pattern shown in FIG. 2C, which is generated by a logical AND operation of the mask pattern and the binary image data pattern, is printed. Specifically, although the binary image data shown in FIG. 2A has four dots to be formed, no dot is actually formed in the first pass. On the contrary, the second pass shown in FIG. 2D forms all of the rest of four dots. As described above, some patterns of a mask pattern and binary image data (dot data) may cause an interference between the mask pattern and the binary image data to cause various harmful effects such that prevents the multi-pass printing from providing the full function. In addition to the example shown in FIGS. 2A to 2D, an opposite case also may be caused in which four dots are formed in the first pass and no dots are formed by the second pass. The interference also may be caused, regardless of a data size, in combinations of various binary image data patterns and the corresponding pass mask patterns.

The interference as described above may be caused in a mask processing for each scanning to the entire binary image data. The uneven dot arrangement to a certain scanning as described above causes dots to be arranged close to one another and then leads occurring of the grain in an intermediate image on the way to completing an image as described above.

On the other hand, Japanese Patent Laid-Open No. 2001-150700 discloses a technique for dividing multi-value image data without using a mask pattern to subject multi-valued image data for the respective passes to the respective quantization processes (error diffusion method) so as to generate binary image data (dot data) (Embodiment 4 of this publication in particular). Specifically, in the case of a two pass printing, image data of a region completed by the two scans is divided to two pieces of image data so that the respective pixel values (density values) have to be ½ value. Then, the respective divided pieces of image data are subjected to respective error diffusions having different error distribution factors to generate dot (binary) data for the respective two scans. It is noted that Japanese Patent Laid-Open No. 2001-150700 also has description that according to which different threshold values are used instead of using different error distribution factors.

However, Japanese Patent Laid-Open No. 2001-150700 determines separately error distribution factors in the error diffusions so as to be independent for passes and thus error diffusion processes are not associated to one another for the respective passes. Specifically, a result of one error diffusion for one pass is not reflected on the other error diffusion for other pass. Thus, generation of binary image data (dot data) is performed while a result of one error diffusion is not being reflected on other error diffusion. Specifically, dot data is generated without considering the dispersibility of dots printed in a certain scan with a certain color and dots printed in an another scan with different or identical color. Such a data generation cannot suppress the generation of grain due to the uneven or adjacent dot arrangement in the intermediate image as described above.

An objective of the present invention is to generate image data so that a grain is prevented from occurring when image data corresponding to a plurality of scans is generated by executing a quantization process to N value such as an error diffusion process and a dither process.

Another object of the present invention is to generate image data so that a grain is prevented from occurring when image data corresponding to a plurality of print heads ejecting the same color of inks in a single scan is generated by executing a quantization process to N value.

In the first aspect of the present invention, there is provided an image data generating apparatus that generates image data used for printing an image on a unit area of a printing medium by a plurality of scans of a printing head, the apparatus comprising: a divider that divides multi-valued image data representing the image to be printed on the unit area into multi-valued image data corresponding to the respective plurality of scans; and a generator that generates respective n-valued image data corresponding to the respective plurality of scans by sequentially executing quantization processes to divided multi-valued image data obtained by the divider; wherein the generator executes subsequent quantization process based on results of precedent quantization process which has been precedently executed.

In the second aspect of the present invention, there is provided an image data generating apparatus that generates image data used for printing an image on a unit area of a printing medium with performance of a plurality of scans of a printing head for ejecting inks having plural colors, the apparatus comprising: a divider that divides multi-valued image data for each color representing the image to be printed on the unit area into multi-valued image data of each color which corresponds to the respective plurality of scans; and a generator that generates respective n-valued image data of each color which corresponds to the respective plurality of scans by sequentially executing quantization processes to divided multi-valued image data of each color obtained by the divider; wherein the generator executes subsequent quantization process based on results of precedent quantization process which has been precedently executed.

In the third aspect of the present invention, there is provided an image printing apparatus that performs printing of an image on a unit area of a printing medium by a plurality of scans of a printing head, the apparatus comprising: a divider that divides multi-valued image data representing the image to be printed on the unit area into multi-valued image data corresponding to the respective plurality of scans; a generator that generates respective n-valued image data corresponding to the respective plurality of scans by sequentially executing quantization processes to divided multi-valued image data obtained by the divider; and a printing unit that performs printing on the unit area by use of the printing head based on the generated n-valued image data in each of the plurality of scans, wherein the generator executes subsequent quantization process based on results of precedent quantization process which has been precedently executed.

In the fourth aspect of the present invention, there is provided an image data generating method for generating image data used for printing an image on a unit area of a printing medium by a plurality of scans of a printing head for ejecting inks having plural colors, the method comprising: a dividing step of dividing multi-valued image data for each color representing the image to be printed on the unit area into multi-valued image data of each color which corresponds to the respective plurality of scans; and a generating step of generating respective n-valued image data of each color which corresponds to the respective plurality of scans by sequentially executing quantization processes to divided multi-valued image data of each color obtained in the dividing step; wherein the generating step executes subsequent quantization process based on results of precedent quantization process which has been precedently executed.

According to the above structure, when pieces of multi-valued image data are sequentially subjected to an n value conversion process, a subsequent n value conversion process is performed based on the result of a precedent n value conversion process. This allows a dot arrangement made by superposing respective dot arrangements of different colors or of different scans, or superposing respective dot arrangements of same color and same scan to have high dispersiveness. As a result, beading or grain in an intermediate image in particular can be suppressed from occurring.

Further features of the present invention will become apparent from the following description of exemplary embodiments (with reference to the attached drawings).

BRIEF DESCRIPTION OF THE DRAWINGS

FIGS. 4A and 4B are diagram showing one embodiment of the present invention in which C, M, and Y inks are used to perform a two pass multi-pass printing;

FIGS. 9A to 9G are diagrams illustrating the binarization processing shown in FIG. 8 by data contents;

FIG. 10 is a diagram showing an example of a dither pattern used for binarization of a first plane, according to a second embodiment of the present invention;

FIG. 18 is a diagram showing an example of a dither pattern used for binarization of a second plane, according to a third embodiment of the present invention; and FIGS. 19A to 19G are diagrams for illustrating binarization processing according to the third embodiment.

BEST MODE FOR CARRYING OUT THE INVENTION

Hereinafter, an embodiment of the present invention will be described with reference to the drawings.

(First Embodiment)

One embodiment of the present invention relates to a case in which printing is performed by ejecting respective inks of cyan (C), magenta (M), and yellow (Y) used in an ink jet printing apparatus in divided two scans. In this case, in accordance with the printing operation divided into two scans, binary image data for driving the respective printing heads of C, M, and Y inks C, M, Y inks (hereinafter referred to as "dot data" or "ejection data") exists. In this specification, a collection of image data (binary data, multi-value data) which is distinguished by a color of the image data and a scan in which the image data is used for printing is called as "plane".

Figure 3:
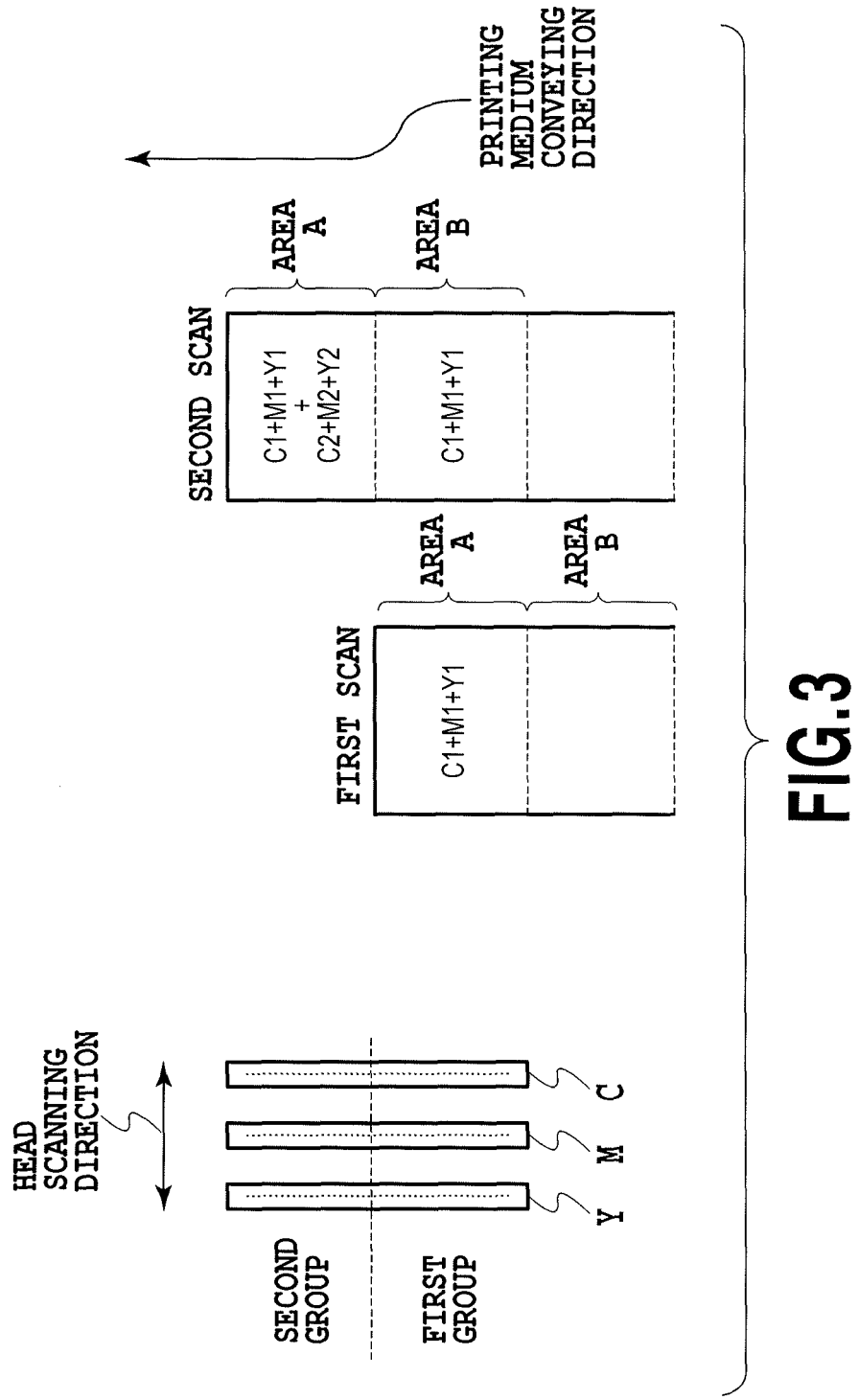
FIG. 3 is a diagram showing a relation between a printing head and a printing medium when a two pass printing is performed.
Figure 5:
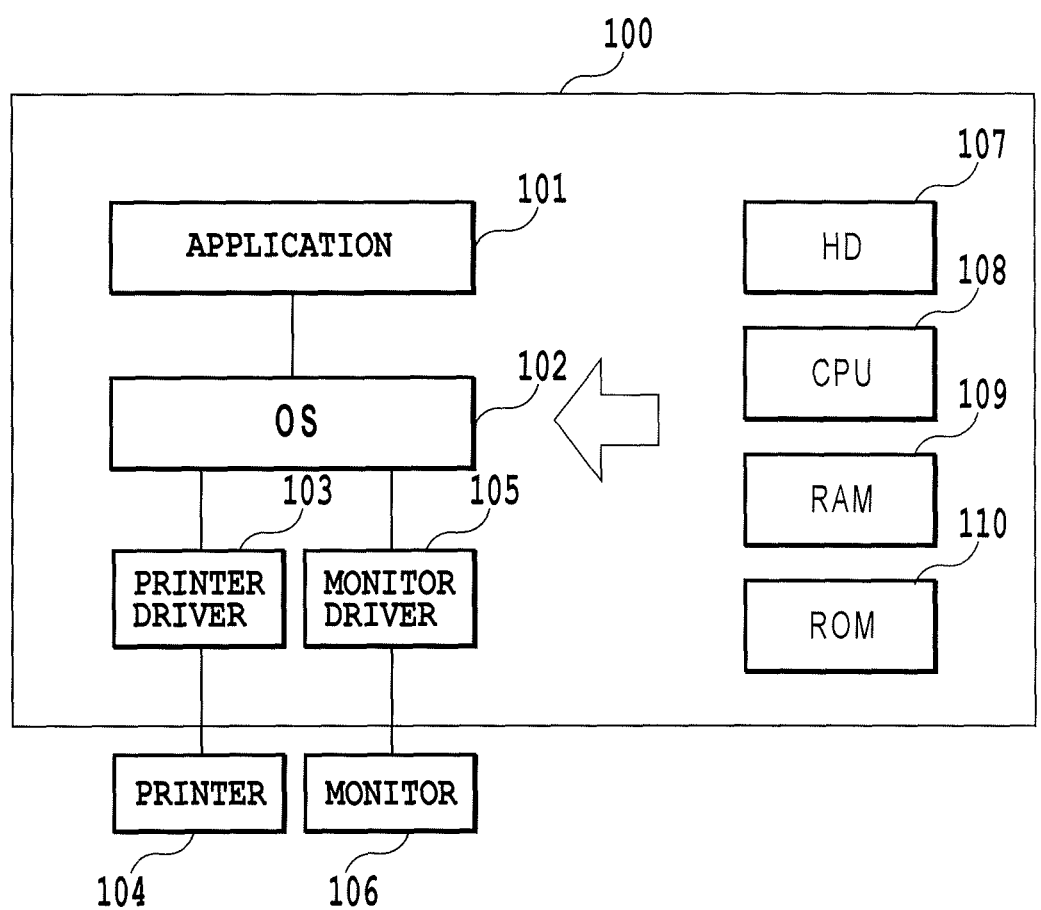
FIG. 5 is a block diagram mainly illustrating hardware and software configurations of a personal computer as an image processing apparatus according to Embodiment 1 of the present invention.

FIG. 3 is a diagram schematically showing a relation between a printing head and a printing medium in a two pass printing that can be executed by a printer (ink jet printing apparatus) 104 shown in FIG. 5. In FIG. 3, a case will be described in which a two pass printing is performed by three colors of cyan, magenta, and yellow for illustration and simplification of description. As described below, in the case of a two pass printing, two times of scanning of a printing head are used to complete an image to be printed in a unit area of a printing medium.

Each of the nozzle arrays of cyan, magenta, and yellow is divided to two groups of the first group and the second group. Each of the groups includes 256 nozzles. Thus, the nozzle array of each color includes 512 nozzles.

Each color nozzle group ejects ink to a unit area of a printing medium while scanning in a direction ("head scanning direction" shown by the arrow of FIG. 3) substantially orthogonal to the nozzle arrangement direction. In this example, based on binary image data of C, M, and Y, ink of C, M, and Y is ejected to the respective unit areas. When a scanning is completed, a printing medium is conveyed in a direction orthogonal to a scanning direction ("printing medium convey direction" shown by the arrow) by a width of one group (256 pixels having the same width as a unit area). As a result, an image is completed on an area on the printing medium which has a size corresponding to the width of each nozzle group by two times of scanning.

This will be described more specifically. In the first scan, an area A on a printing medium is printed by using the first group of C nozzles, the first group of M nozzles, and the first group of Y nozzles in an order of C, M, and Y. Next, in the second scan, the area A that has been printed in the first scan is printed by using the second group of C nozzles, the second group of M nozzles, and the second group of Y nozzles in an order of Y, M, and C to perform the remaining printing, and an area B that has not been printed yet is printed by using the first group of C nozzles, the first group of M nozzles, and the first group of Y nozzles in an order of Y, M, and C. By repeating the operation as described above, the respective unit areas (area A, area B) are printed in an order of C1, M1, Y1, Y2, M2 and C2 or in an order of Y1, M1, C1, C2, M2 and Y2.

FIGS. 4A and 4B are diagrams for illustrating the printing order to the unit area in a case where C, M, and Y inks are used to perform a multi-pass printing of two pass.

FIG. 4A shows how an image in the area (the area A of FIG. 3) printed in an order of a forward scanning and a backward scanning is completed. In a forward scanning as a first scan (a first pass), a cyan image is first printed based on cyan dot data generated by a data division and a binarization process which will be described later with reference to FIG. 6. Then, in the same scanning, magenta and yellow images are also printed based on the dot data generated by the data division and the binarization process in a sequential superposing manner in which the magenta image is superposed on the previously printed cyan image and the yellow image is superposed on the previous cyan and magenta images. In a backward scanning as a second scan (a second pass) that is performed after the conveying of a printing medium by a predetermined amount (the width of each nozzle group), yellow, magenta and cyan images are sequentially superposed on the previously printed images based on yellow, magenta and cyan dot data generated by the data division which will be described later.

On the other hand, FIG. 4B shows how an image is completed in the area (the area B shown in FIG. 3) printed in an order of a backward scanning and a forward scanning. In a backward scanning as a first scan (a first pass), a yellow image is printed based on yellow dot data generated by the data division and the binarization process which will be described later. In the same scanning, magenta and cyan images are also printed based on the dot data generated by the data division and the binarization process which will be also described later in a sequential superposing manner in which a magenta image is superposed on the previously printed yellow image and a cyan image is superposed on the previous printed yellow and magenta images. Similarly, in a forward scan as second scan (a second pass) that is performed after the conveying of the printing medium by a predetermined amount, images are sequentially printed to be superposed on the previously printed images, based on similarly generated cyan, magenta, and yellow dot data.

In this embodiment, a dot arrangement obtained by superposing six planes of dot data for the above forward and backward scans of the three colors of yellow, magenta, and cyan is favorably dispersed and thus binary ejection data is generated so as to minimize low frequency components that do not exist in multi-valued image data that is subjected to a quantization process for generating the binary ejection data. Here, the term "low frequency components", which do not exist in multi-valued image data before the quantization process, means the one caused due to the above-described interference between a mask pattern and an image data pattern. Binary data of the respective planes is generated so as to decrease low frequency components in respective dot distribution on the superposed planes of "the first pass C+ the first pass M", "the first pass C+ the first pass M+ the first pass Y", "the first pass C+ the first pass M+ the first pass Y+ the second pass Y", "the first pass C+ the first pass M+ the first pass Y+ the second pass Y+ the second pass M", "the first pass C+ the first pass M+ the first pass Y+ the second pass Y+ the second pass M+ the second pass C", which are obtained by the superposition in an order of the first pass C, the first pass M, the first pass Y, the second pass Y, the second pass M, and the second pass C, which is the ejection order of the printing head in each of scans (hereinafter referred to as pass) by which printing is performed in the order shown in FIG. 4A. In particular, binary data generation is performed so that not only the dispersibility of the final superposition of "the first pass C+ the first pass M+ the first pass Y+ the second pass Y+ the second pass M+ the second pass C" but also the intermediate superposition of planes (hereinafter also referred to as "intermediate image" in this specification) have reduced low frequency components.

Furthermore, an area printed in the order of FIG. 4B is subjected to data generation so that the similar image dot distribution obtained by superposing the first pass C, the first pass M, the first pass C, the second pass C, the second pass M, and the second pass Y has the above distribution having a high dispersibility. Although in this embodiment, description will be give for the order of FIG. 4A in detail, the order of FIG. 4B is common to FIG. 4A except for an order in which ink is ejected and the same processing may be performed in the ejection order. In this embodiment, the number of pixels of a plane to be processed is 256 pixels (nozzle arrangement direction)×the number of pixels corresponding to the printing width (main scanning direction)).

When four colors of inks additionally using black (Bk) are used or when a light color ink having a low concentration and a particular ink such as red, blue or green ink are additionally used, it is clear that the present invention also can be applicable, from the following description.

FIG. 5 is a block diagram mainly illustrating hardware and software configurations of a personal computer (hereinafter simply referred to as PC) as an image processing apparatus (image data generation apparatus) according to the first embodiment of the present invention.

In FIG. 5, a PC 100 as a host computer uses an operating system (OS) 102 to operate the respective software of application software 101, a printer driver 103, and a monitor driver 105. The application software 101 performs a processing related to word processing, table calculation, or internet browser for example. The monitor driver 105 performs a processing such as a processing for generating image data displayed on a monitor 106.

The printer driver 103 executes image processing for image data or the like issued from the application software 101 to the OS 102 to finally generate binary ejection data used by the printer 104. More specifically, by executing the image processing which will be described later with reference to FIG. 6, C, M, and Y binary image data used by the printer 104 is generated from C, M and Y multi-valued image data. The binary image data thus generated is transferred to the printer 104.

The host computer 100 includes, as various hardware for operating the software as described above, a CPU 108, a hard disk drive (HD) 107, a RAM 109, and a ROM 110 for example. Specifically, the CPU 108 performs the processing based on the above software program stored in the hard disk 107 and the ROM 110 and the RAM 109 is used as a work area for the execution of the processing.

As described in FIG. 3, the printer 104 of this embodiment is a so-called serial type printer that scans a printing head for ejecting ink to a printing medium during which ink is ejected for printing. By attaching the printing head having the respective ejection opening groups corresponding to the respective C, M, and Y inks to a carriage, the head can be scanned to a printing medium such as a printing paper. A flow pass communicating with each ejection opening of the printing head includes printing elements (electro-thermal conversion element, piezoelectric element). By driving these printing elements, ink is ejected from these ejection openings. The respective ejection openings are arranged with a density of 2400 dpj and the respective ejection openings eject ink of 3.0 picoliter. The ejection opening group of each color has 512 ejection openings.

The printer 104 includes a CPU and memory (not shown). Binary image data transferred from the host computer 100 is stored in the memory of the printer 104. Then, under the control by the CPU of the printer, the binary image data stored in the memory is read and is sent to a driving circuit of the printing head. The driving circuit drives the printing elements of the printing head based on the sent binary image data to eject ink from the ejection openings.

The printing method of this embodiment is the so-called multi-pass method of two passes as shown in the above described FIG. 3 in which printing for respective predetermined areas are sequentially completed with two times of scanning. In this two pass printing, binary image data for ejecting ink from the respective ejection openings in each scanning is generated by an image processing which will be describe later with reference to FIG. 6. Thus, as described with reference to FIG. 4A, dot distributions in superposed planes obtained by superposing the first pass C, the first pass M, the first pass Y, the second pass Y, the second pass M, and the second pass C include reduced low frequency components.

Figure 6:
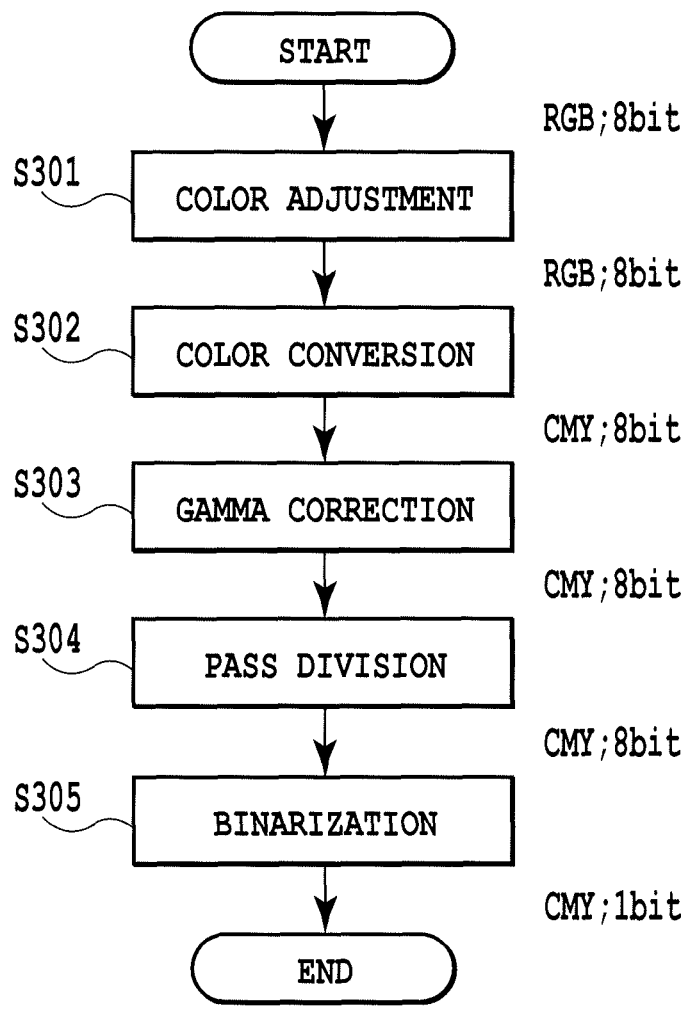
FIG. 6 is a flowchart illustrating a procedure of an image processing according to a first embodiment of the present invention.
Figure 7:
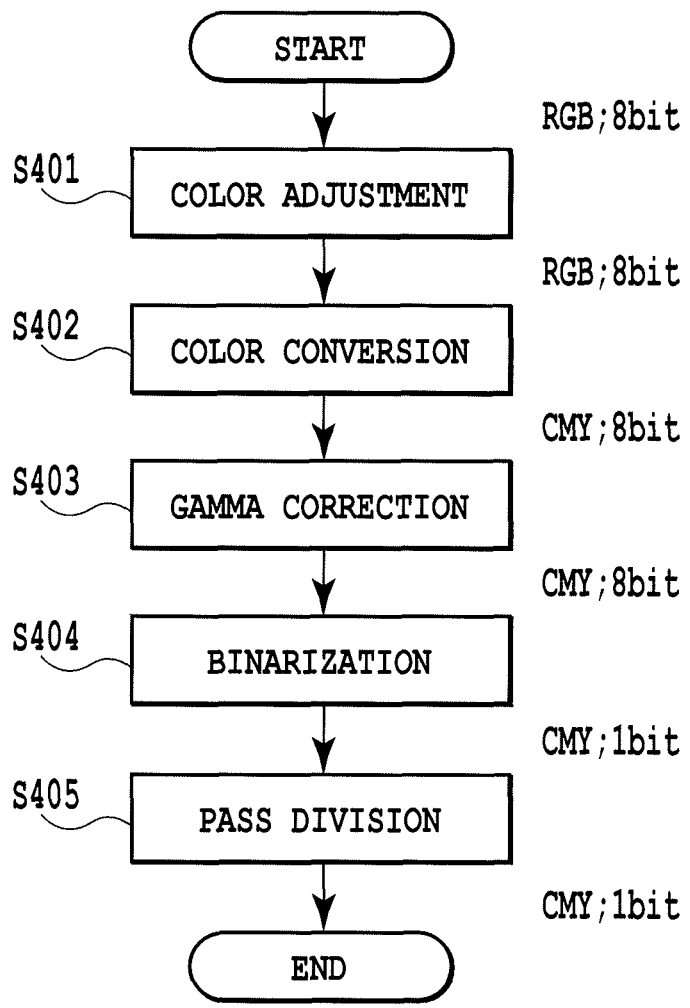
FIG. 7 is a flowchart illustrating a conventional image processing for the comparison with the processing shown in FIG. 6.

FIG. 6 is a flowchart showing a procedure of an image processing according to the first embodiment of the present invention. FIG. 7 is also a flowchart showing a conventional image processing for the comparison with the processing shown in FIG. 6. Hereinafter, with regards to an image data generation processing for each plane among the image processing, an image processing according to this embodiment will be described for the comparison with a conventional image processing.

First, in steps S301 and S402, a color adjustment processing such as an input Y correction is executed for R, G and B data of an image obtained from an application or the like.

Next, steps S302 and S402 perform, for RGB image data, a conversion from R, G, and B color gamuts to color gamuts by ink color components C, M, and Y used in a printer as well as the generation of color component data C, M, and Y for representing colors in the converted color gamuts. These processes are usually performed by using a lookup table and interpolation calculation. This processing converts R, G B 8 bit image data to C, M, Y 8 bit data (multi-valued image data). Next, steps S303 and S403 perform an output Y correction to adjust an input-output gradation characteristics of a printing head used in the printer 104.

Figure 1:
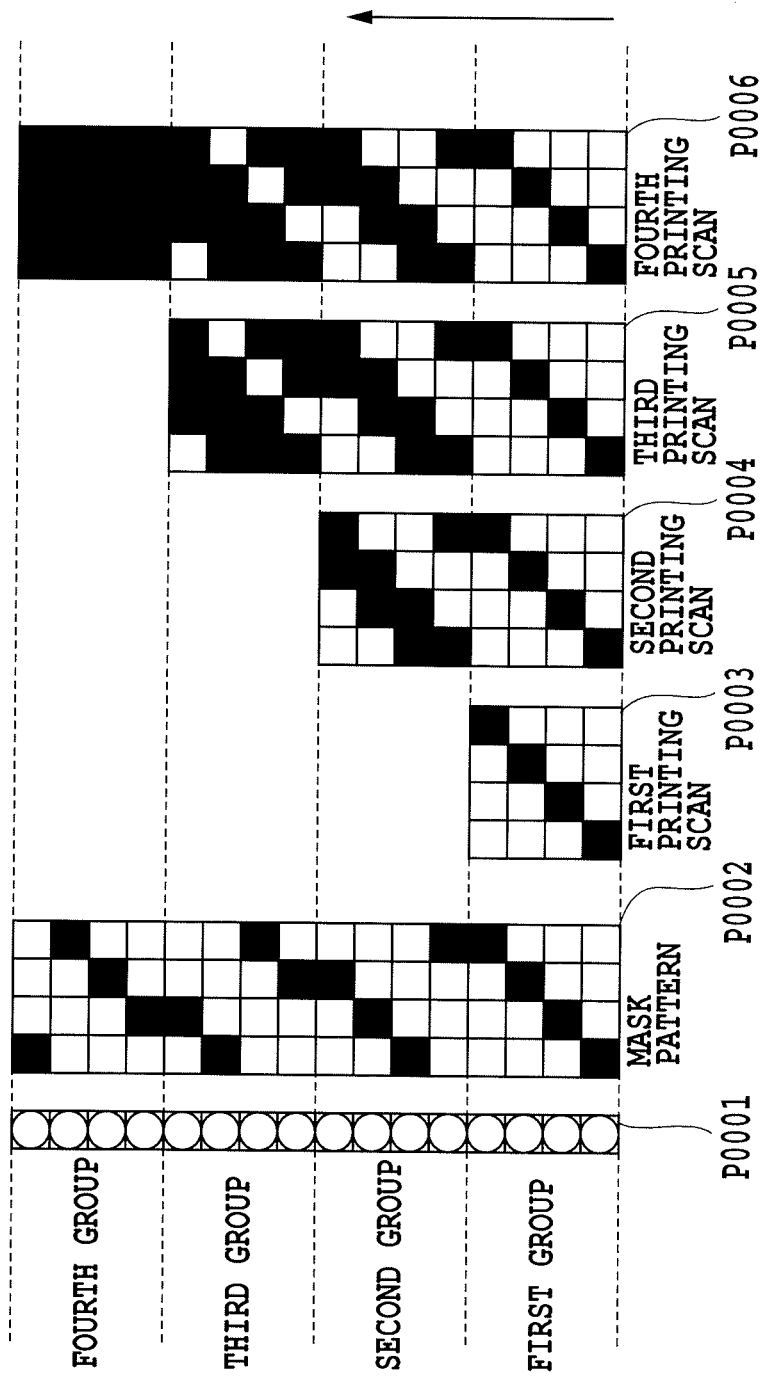
FIG. 1 is a schematic diagram of a multi-pass printing by a printing head or a printed dot pattern.
Figure 2:
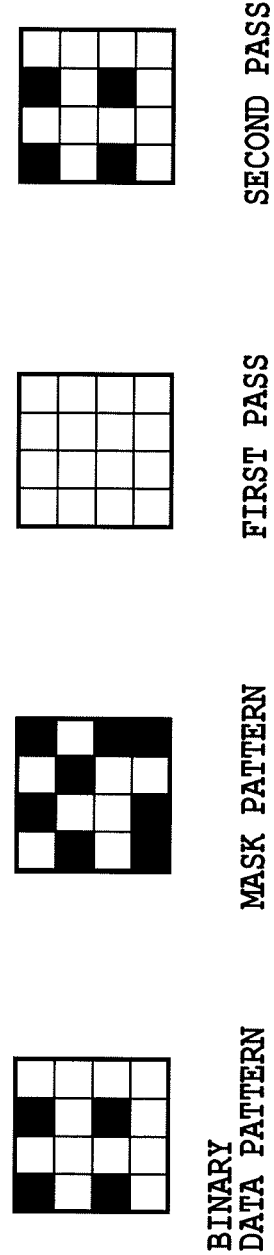
FIGS. 2A to 2D are diagrams illustrating an interference of a mask pattern used for the quantization of printing data.

Next, in the conventional example shown in FIG. 7, step S404 performs the binarization for C, M, Y multi-valued image data in which a binarization processing is executed by using an error diffusion method for example to obtain binary image data. Next, step S405 performs pass division for dividing binary image data to data for the respective passes. The pass division is performed by using a mask pattern as described above with reference to FIG. 1. In this case, an interference may be caused between a mask pattern and a binary image pattern. With regards to these mask patterns, dot data for the total six planes composed of the respective two passes of C, M, and Y generated by the mask patterns do not consider favorable dispersibility with regards to the mutual arrangement of dots. As a result, the above described problem of grain may be caused.

On the other hand, according to this embodiment, in step S304, a pass division at the stage of multi-valued image data is executed before a binarization process. Specifically, the respective C, M and Y 8 bit data (multi-valued image data) are divided to two scans. Thereafter, in step S305, C, M and Y multi-valued image data is subjected to a binarization process (error diffusion processing) so that a dot arrangement of the logical sum or the logical product of the dot arrangements of the six planes is more favorably dispersed when compared with a case where dots in the respective planes are determined so as to have no relation to one another. The term "logical sum" means image data obtained by acquiring a logical sum of image data at an identical pixel position with regards to binary image data of a plurality of planes. The term "logical product" means image data obtained by a logical product of image data at an identical pixel position with regards to binary image data of a plurality of planes. As a result, characteristic of dot arrangements between the respective planes are that the dot arrangement are dispersed favorably, that is, the dot arrangement has few frequency components in the frequency spectrum, which do not exist in multi-value data that is before subjected to the binarization. In particular, as described above with reference to FIGS. 4A and 4B, when planes are superposed based on an order of the generation of dots in two scannings, any superposition can have a dot arrangement in which low frequency components not existing in multi-valued image data that is before subjected to the binarization are reduced. As the most easily understandable example, when uniform 8 bit multi-valued image data is subjected to an error diffusion processing as in this embodiment for example, a logical product or a logical sum of a plurality of planes can have fewer frequency components when compared with a case where planes are subjected to an error diffusion processing so that the planes have no relation to one another. This can suppress grain by the respective C, M, and Y inks applied to a printing medium and can prevent, even when such a grain may be caused, the distribution from being made in an uneven manner.

Hereinafter, a pass division of Step S304 and a processing of Step S305 for executing binarization to the divided multi-valued image data to generate dot data will be described in detail.

The pass division of Step S304 divides C, M, and Y multi-valued image data of 8 bit to two parts, respectively. In this embodiment, 8 bit data represented by 0 to 255 shows that "255" shows the highest density and "0" shows the lowest density. Thus, half of density "100" is "50". For example, when 8 bit data is represented by C, M, and Y=100, 100, and 100, the respective data value 100 is simply halved so that the first pass and the second pass have the substantially equal density to result in C, M, and Y=50, 50, and 50. In this manner, for six planes of the first pass of C, the first pass of M, the first pass of Y, the second pass of C, the second pass of M, and the second pass of Y, 8 bit data is obtained respectively.

Although this embodiment has evenly divided a value of multi-valued image data to two parts, this is not always required. This value also may be divided in an uneven manner. For example, the first pass may have ⅗ of a pixel value and the second pass may have ⅖ of a pixel value. In this case, C, M, and Y=60, 60, and 60 corresponding to ⅗ of C, M, and Y=100, 100, and 100 are multi-valued data of the first pass, and C, M, and Y=40, 40, and 40 corresponding to ⅖ of C, M, and Y=100, 100, and 100 are multi-valued data of the second pass.

Next, in step S305, the respective six planes are subjected to a binarization process by the error diffusion method according to this embodiment. The binarization processing is featured in that pieces of multi-valued image data (planes) corresponding to respective colors and respective scans are sequentially subjected to error diffusion processes so that the subsequent error diffusion process is executed based on the result of the previously performed error diffusion process.

Hereinafter, this characteristic process will be described with reference to FIG. 8, FIG. 9, and FIG. 10.

Figure 8:
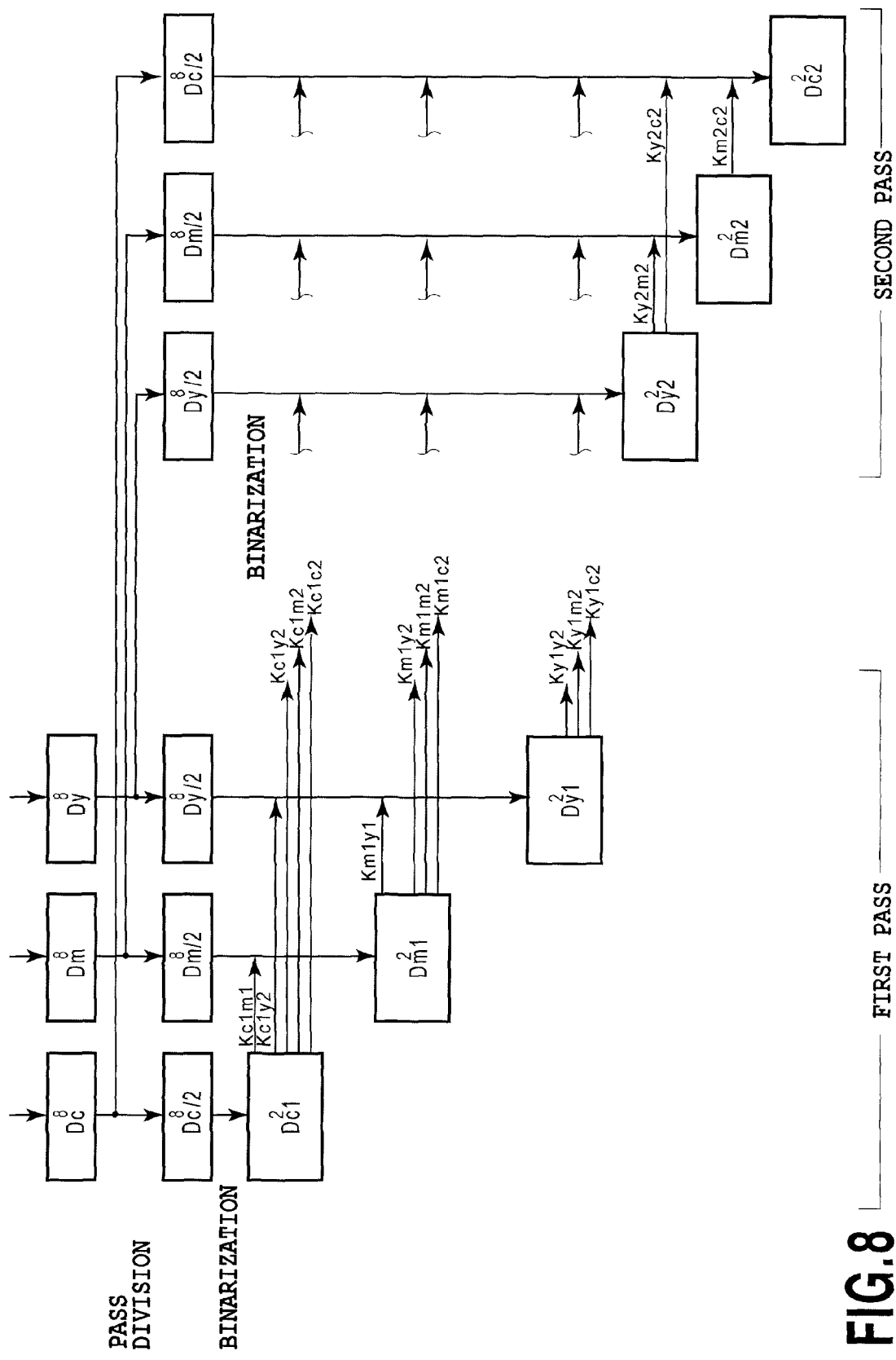
FIG. 8 is a diagram illustrating the concept of a pass division and a binarization processing shown in FIG. 6.

FIG. 8 is a diagram illustrating the concept of a pass division and the binarization processes of steps S304 and S305 respectively. The binarization process according to the first embodiment of the present invention uses an error diffusion method in the case that dot data of for example total six planes of two passes for each of C, M and Y colors is generated so as to sequentially generate planes in an order of dot formation by the scanning of a printing head. Then, the result of the binarization processing for the already-generated plane is reflected on a binarization processing of a plane to be generated. The binarization processing shown in FIG. 8 shows a processing in an order of the dot formation shown in FIG. 4A. The respective planes generated by the binarization processing of this embodiment has a size of the main scanning direction (lateral direction)×nozzle arrangement direction (longitudinal direction)=printing width×256 pixels as a unit area. Image data to be printed is subjected to the data division and the binarization processes based on this size as a unit so as to execute the data division and the binarization processes to the entire image data. Although the following description will describe a processing to data of one pixel for simplification of the description, pixels in a plane are sequentially subjected to a processing in an actual case. In particular, although this embodiment uses an error diffusion method as a binarization method as described later, this processing is executed by sequentially moving target pixels as is well known.

In FIG. 8, multi-valued data D8c, D8m and D8y of one pixel for each C, M and Y of 8 bit obtained by step S303 is divided by the pass division to data D8c/2, D8m/2, and D8y/2 having a pixel value of ½. One of the multi-valued data thus divided is multi-valued data for the first pass and the other is original data of multi-valued data for the second pass.

In the binarization process, divided multi-valued data D8c/2 of C is firstly subjected to an error diffusion process to obtain binary data D2c1 for the first pass of C. Next, divided multi-valued data D8m/2 of M is subjected to a binarization processing. In this binarization according to this embodiment, the divided multi-valued data D8m/2 of M is corrected so that a term of Kc1m1 (D8c/2-D2c1) is added to the divided multi-valued data D8m/2 of M. Here, an average of the term Kc1m1 (D8c/2-D2c1) approaches close to 0 (zero) if the area for which the binarization is executed becomes broader. This is because that average densities of neighbor pixels in before and after the binarization process are not so different due to a conservation of density as a function of the error diffusion. Accordingly, if a term (D8c/2-D2c1) is obtained for sufficient broad area, the term obtained by multiplying the term (D8c/2-D2c1) by Kc1m1 becomes 0 (zero). Then, this corrected multi-valued data [D8m/2+Kc1m1 (D8c/2-D2c1)] is subjected to the error diffusion process to obtain binary data D2m1 for the first pass of M.

In this manner, in this embodiment, the results of the previously-performed error diffusion processes are reflected on the subsequent error diffusion process. In Generalization, when N×K types of multi-valued image data corresponding to N times of scanning (N is an integer of 2 or more) and K inks (K is an integer of 2 or more) are sequentially subjected to an error diffusion in an order of the first one to the NKth one, the Xth data (1≦X≦NK) is subjected to the error diffusion process based on the X−1th kinds of results of the error diffusion processes that have been performed for the respective first to the X−1th data. In this case, it is preferable that a probability at which an ink ejection position indicated by binary image data obtained by the subsequent error diffusion processing is not identical with an ink ejection position indicated by the binary image data obtained by the previous error diffusion processes is higher than a probability at which the former is identical with the later. By such a process, dot dispersibility can be increased.

In the above correction term, $D8c/2$ is divided multi-valued data of C as described above and $D2c1$ is the result of the binarization processing to the divided data. $Kc1m1$ is a weighting coefficient and is determined correspondingly to how much the planes are related to each other.

It is noted that an algorism for adding a correction term for reflecting a certain dot arrangement on another dot arrangement to perform an error diffusion process is disclosed by Japanese Patent No. 3208777. According to Japanese Patent No. 3208777, a tone printing with dark and light dots is performed to generate binary data of dark dots by an error diffusion process based on a print density shred by the dark dots and to correct a print density shared by light dots with the result of the error diffusion for the dark dots. Then, the error diffusion process is performed for the corrected print density to generate binary data of the light dots.

On the other hand, this embodiment uses the above algorithm in order to perform reflections among the planes corresponding to the ink colors and the number of times of scanning. According to this embodiment, dot arrangements of not only one plane but also a plurality of planes have an influence on the dot arrangement of one plane. The weighting coefficient showing the level of the influence is different based on the difference of the dot formation timing depending on the respective color inks and the number of times scanning.

After the generation of C and M planes of the first pass, the generation of the third Y plane performs correction in which a correction term ($Kc1m1$ ($D8c/2-D2c1$)+$Kc1y1$ ($D8m/2-D2m1$)) based on the results of the first and second error diffusions is added to the divided multi-valued data $D8y/2$. Then the corrected multi-valued data [$D8y/2+(Kc1m1(D8c/2-D2c1)+Kc1y1$ ($D8m/2-D2m1$))] is subjected to the binarization to obtain binary data $D2y1$ for the first pass of Y. In this manner, the generation of the third plane performs a correction that reflects the result of the respective binarization processes for the first and second planes that have been subjected to the processes and the corrected data is subjected to the error diffusion process. Subsequently, Y, M, and C planes of the second pass are also subjected to the correction for reflecting the results of the respective error diffusion processes that have been executed for generating the respective precedent planes of binary data.

In the above example, although multi-valued data for the respective colors is uniformly divided to two parts, this division also may be performed unevenly. For example, the first pass of cyan may be $D8c/3$ and the second pass may be $(D8c/3) \times 2$. The same also applied to a case other than two pass (e.g., fourth pass) and the first pass and the fourth pass can have lower density ratios than those of the second pass and the third pass.

When the generation of six planes of this embodiment is generalized as the generation of "N" planes, the following result is obtained. It is noted that the number of passes does not always correspond to the division ratio and thus divided data is not represented by "/2" such as "D8/2" but the jth divided data is simply represented as "$D8j$".

Correction terms for the generation of the jth plane among the first to Nth planes is represented as shown below because of reflecting the binarization processes for the first to j−1th planes.

$$K[1][j](D81-D21)+ \ldots +K[j-1][j](D8j-D2j)$$

The jth data corrected by the addition of this correction term is represented by the following formula.

$$Dj=D8j+(K[1][j](D81-D21)+ \ldots +K[j-1][j](D8(j-1)-D2(j-1))$$

In the formula, $K[i][j]$ is a weighting coefficient of a correction term given by the "i"th data to the "j"th data.

This corrected data is subjected to an error diffusion processing to obtain dot data $D2j$.

FIGS. 9A to 9G are diagrams for illustrating the binarization processes shown in FIG. 8 with contents of data.

In FIGS. 9A to 9G, a plane size is represented by four pixels X four pixels for simple illustration and simplification of description.

FIG. 9A shows the 8 bit divided multi-valued data $D8c/2$ of cyan (C). For simple description, a case is shown in which all pixel values are 100. FIG. 9B shows the binary data $D2c1$ obtained by subjecting the divided multi-valued data $D8c/2$ to an error diffusion process. It is noted that this binary data is binary data having any of "0" or "255" and similar in the following description.

Next, FIG. 9C shows the correction data generated by using the divided multi-valued data $D8c/2$ and binary data $D2c1$. Specifically, the multi-valued correction data is a difference obtained by subtracting, from the divided multi-valued data $D8c/2$ of FIG. 9A, the binary data $D2c1$ of FIG. 9B. Then, this correction data is added to the divided multi-valued data $D8m/2$ of magenta (M). In this addition, $Kc1m1$ as a weighting coefficient for corrected data is used. When $Kc1m1=1$ is established, the correction data is directly added to the magenta divided multi-valued data. When $Kc1m1=0.5$ is established, the half of the value of the correction data is added to the magenta divided multi-valued data. In the shown example, $Kc1m1=0.5$ is established. FIG. 9D shows the correction data of the example. With the correction data shown in FIG. 9D, the magenta divided multi-valued data $D8m/2$ of the next plane shown in FIG. 9E is corrected. FIG. 9F shows the multi-valued data after correction that is represented as a sum of data shown in FIG. 9D and data shown in FIG. 9E. Then, the corrected data shown in FIG. 9F is subjected to an error diffusion and magenta binary data shown in FIG. 9G for the second plane is obtained. The generation of the subsequent third to sixth planes is similarly performed as described for FIG. 8. As described above, since the result of the precedent error diffusion process (e.g. FIG. 9B) is used to perform the subsequent error diffusion process, the subsequent error diffusion process can be performed so that a dot arrangement having less superposition with a dot arrangement determined by the precedent error diffusion process is obtained.

More specifically, in the above process, the correction data has, as shown in FIG. 9C, a smaller value (−155) for a pixel (e.g., pixel 801) for which a dot (255) is arranged in the plane C shown in FIG. 9B. Thus, the dot arrangement in the corrected magenta (M) plane (FIG. 9G) can prevent a dot from being arranged in such pixel (801). Specifically, in the corrected data shown in FIG. 9F, a value of the pixel for which a dot is arranged in the plane C shown in FIG. 9B (e.g., pixel 801 of a value of 255) becomes smaller and a value of the pixel for which a dot is not arranged in the plane C shown in FIG. 9B (e.g., pixel of a value of 0) becomes larger. As a result, the next error diffusion processing substantially prevents dots (FIG. 9G) from being generated to be superposed on dots in an already-generated plane (FIG. 9B). In this manner, the dot arrangement of six planes generated in this embodiment can be the one having a lower probability at which dots are superposed to one another. As a result, any combination of six planes can allow superposed dots to be dispersed appropriately. In other words, a frequency spectrum of a dot arrangement obtained by superposing planes has reduced low frequency components. The term "low frequency component" herein means components that exist closer to the low frequency side with regards to the middle of a spatial frequency region in which frequency components (power spectrum) exist.

The characteristic itself of an error diffusion that errors are diffused to neighborhoods contributes to lowering probability of arranging dots on not only pixels for which dots are arranged in an already generated plane but also neighboring pixels of that pixels. As a result, a favorable dispersibility of the dot arrangement when a plurality of planes are superposed can be obtained.

As described above, arrangement information showing how pixels having binary data of "255" which means forming dot are arranged in a certain plane is reflected on the next plane data so that a pixel corresponding to the pixel on which the binary data is placed (at the same position of superposition) has a smaller value. In this case, in addition to a case as shown in FIG. 9 in which corrected data is reduced, a threshold value corresponding to the corresponding pixel may be increased. That is, the arrangement information on binary data is reflected on the next plane data so that the data value of the corresponding pixel is relatively reduced.

Figure 11:
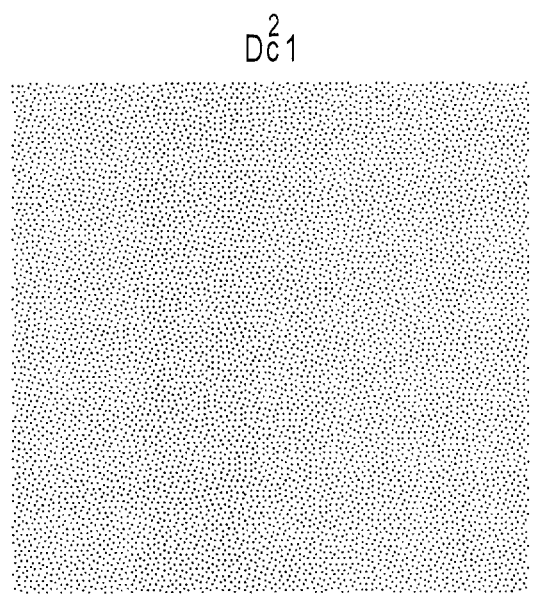
FIG. 11 is a view showing a dot arrangement of the first pass plane of cyan as a result of the binarization processing shown in FIG. 6.
Figure 12:
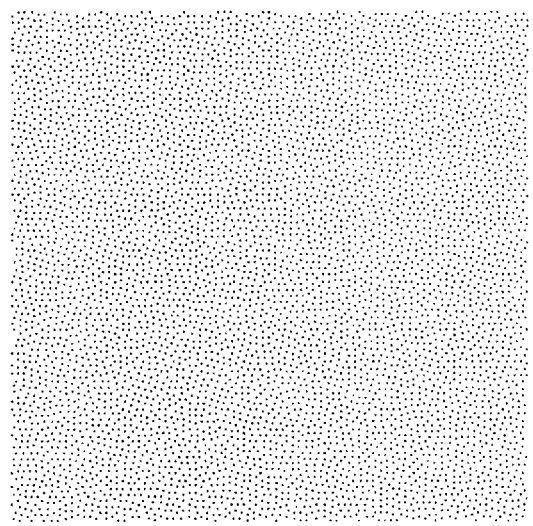
FIG. 12 is a view showing a dot arrangement of the first pass plane of magenta as a result of the binarization processing shown in FIG. 6.

FIG. 11 is a view showing a dot arrangement of a plane of the first pass of cyan (C). For simple illustration, FIG. 11 shows a grey level having a relatively low density having less number of (black) dots and shows dot data (binary data) obtained by executing an error diffusion process for multi-valued data in which values of all pixels are 25/255 as 8 bit data. It is noted that "255" represents the highest density and "0" represents the lowest density. On the other hand, FIG. 12 is a view showing a dot arrangement of a plane of the first pass of magenta (M) in the case that the result of binarization for cyan (FIG. 11) is reflected on the binarization for magenta. As in FIG. 11, FIG. 12 shows dot data obtained by executing an error diffusion process also for 8 bit data of 25/255. In this reflection, the coefficient Kc1$m$1 is 0.3. These drawings show a range of 256 pixels×256 pixels of a pattern of binary image data obtained by the data processing described for FIGS. 8 and 9 which is executed for a unit of a pixel size of a printing width×256 pixels. FIG. 12 shows the binary data obtained by executing an error diffusion process on which the result (FIG. 11) of the binarization for cyan data is reflected, and a single plane shown in FIG. 12 also has a dot arrangement of high dispersiveness. In other words, even though results of quantization for other planes are reflected on the dot arrangement of FIG. 12, the dot arrangement of FIG. 12 has no low frequency components that do not exist in original 8 bit data.

Figure 13:
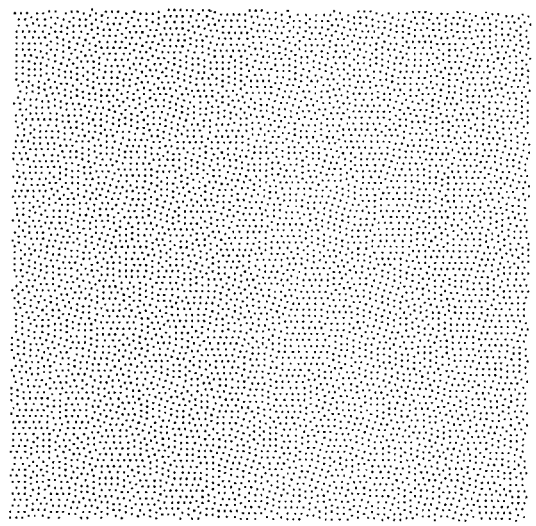
FIG. 13 is a view showing a dot arrangement of the first pass plane of magenta on which a result of the cyan binarization processing is not reflected.
Figure 14:
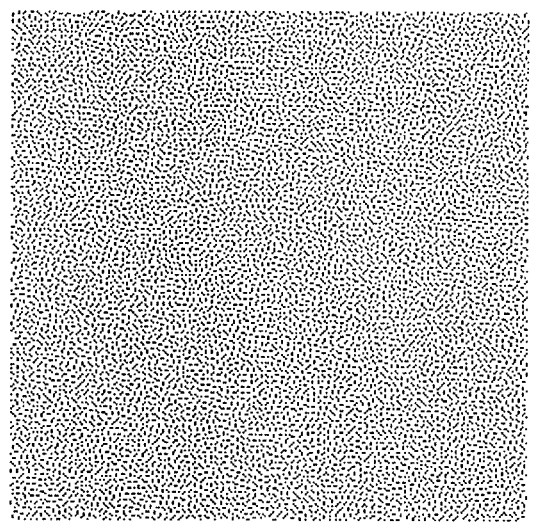
FIG. 14 is a view showing a dot arrangement of a logical sum of cyan and magenta as a result of the binarization processing shown in FIG. 6.
Figure 15:
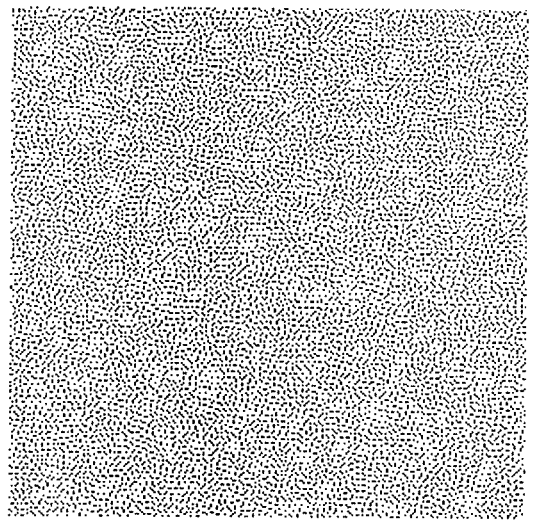
FIG. 15 is a view showing a dot arrangement of a logic sum of cyan and magenta on which the a result to binarization processing for cyan is not reflected.

FIG. 13 is a view showing a plane (corresponding to Kc1$m$1=0) when the result of the binarization of cyan is not reflected on the binarization of magenta. FIG. 14 is a view showing a dot arrangement of the logic sum of the plane shown in FIG. 11 and the plane shown in FIG. 12. FIG. 15 is a view showing a dot arrangement of the logic sum of the plane shown in FIG. 11 and the plane shown in FIG. 13.

While the dot arrangement shown in FIG. 14 has a high dispersibility, the dot arrangement of FIG. 15 including the plane of FIG. 13 on which the result of the binarization of the previous plane is not reflected clearly shows an uneven dot arrangement. Specifically, when the weighting coefficient Kc1$m$1 has a value of 0, an influence by the binarization of cyan is eliminated. When the value of Kc1$m$1 is increased, a relativity between planes is clearly increased and the dispersibility when two planes are added is increased.

Figure 16:
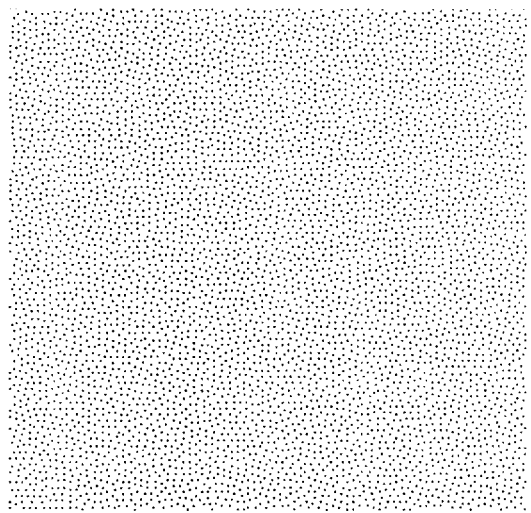
FIG. 16 is a view showing a dot arrangement of the first pass plane of yellow as a result of the binarization processing shown in FIG. 6.
Figure 17:
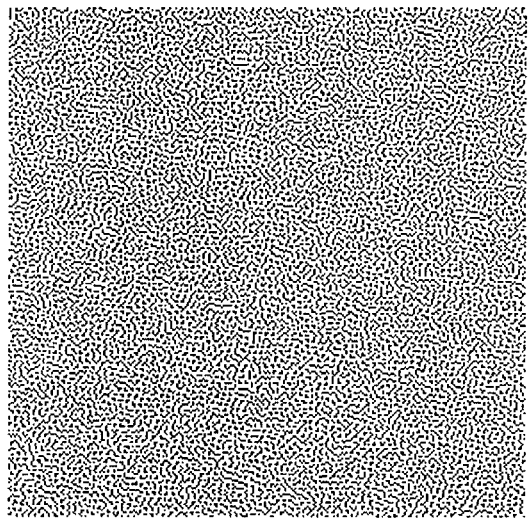
FIG. 17 is a view showing a dot arrangement of a logic sum of cyan, magenta, and yellow as a result of the binarization processing shown in FIG. 6.

FIG. 16 is a view showing a dot arrangement of the plane of yellow (Y) of the first pass when the result of the cyan binarization (FIG. 11) and the result of the magenta binarization (FIG. 12) are reflected on the yellow binarization. This dot arrangement is based on weighting coefficients Kc1$y$1 and Km1$y$1 for cyan and magenta being 0.3 to reflect the results of the binarization of FIG. 11 and FIG. 12 on the binarization for yellow. FIG. 17 is a view showing a dot arrangement of the logic sum of the dot arrangement shown in FIG. 16 and the cyan and magenta dot arrangements shown in FIGS. 11 and 12. The dot arrangement obtained by superposing the three planes in this manner clearly shows no unevenness.

As described above, according to the error diffusion processing of this embodiment, the binary data of each of the planes is arranged so as to be favorably dispersed.

At the same time, the logic sum of the binary data of the plurality of planes according to this embodiment on which the reflection of the results of error diffusion processes is made (weighting coefficients are greater than 0) has more dispersed dot arrangement when compared to a case where the results of the error diffusion processes of the respective planes are not reflected on one another (the error diffusion processings that are performed without considering the results thereof; a weighting coefficient of 0). That is, the logic sum of the binary data of the plurality of planes according to this embodiment includes less low frequency components than those of the logic sum of the binary data of the plurality of planes when the results of the error diffusion processes are not reflected on one another.

A weighting coefficient for the generation of a yellow plane of the first pass can be provided so that Kc1$y$1 and Km1$y$1 are both 0.3. However, other aspects as shown below also may be used.

A weighting coefficient K for the generation of a yellow plane of the first pass can be provided so that Kc1$y$1=0.2 for cyan dot and Kc1$y$1=0.3 for magenta dot are established. This is because a time from the ejection of cyan ink to a printing medium to the ejection of yellow ink is longer than a time from the ejection of magenta ink to the printing medium to the ejection of yellow ink and thus an influence by cyan dots is set to be proportionally reduced. Next, since yellow ink for the second pass is ejected after a relatively long time has passed since the ejection of inks of the respective colors for the first pass, the generation of a yellow plane for the second pass is performed so that the respective planes for the first pass are basically provided with a weighting coefficient of 0.1. In this case, the relativity of the yellow plane to the dot arrangement of the respective planes for the first pass is weaker than that between respective planes for the first pass. Thus, Ky1$y$2=0.7 is set between the planes of yellow for the first and second passes. Further, in the generation of a magenta plane for the second pass, the coefficient Km1$m$2=0.7 is set for the plane of magenta for the first pass, the coefficient ky2$m$2=0/3 is set for the yellow plane of the second pass, and the coefficient is set to be 0.1 for the rest planes. Similarly, with regards to the final cyan plane for the second pass, the coefficient Ky2$c$2=0.2 is set for the yellow plane for the second pass, the coefficient Km2$c$2=0.3 is set for the magenta plane for the second pass, the coefficient Kc1$c$2=0.7 is set for the cyan plane for the first pass, and the coefficient is set to be 0.1 for the rest planes.

As described above, a weighting coefficient is determined depending on the length of the interval of the timings between planes at which ejections of ink are performed so that the longer this interval is, the smaller value the weighting coefficient has. Thereby the planes are less influenced one another. This is because, the longer the interval is, the higher the possibility that ejected ink is absorbed by a printing medium is, and thus a probability of grain being formed due to the contact of inks on a printing medium is reduced. Among different passes, a relatively high weighting coefficient is set between planes of an identical color. This is because that increasing the influence between the planes of an identical color allows the identical color dots to have high dispersibility.

The embodiment described above uses an algorithm disclosed in Japanese Patent No. 3208777 as that for performing a reflection of a binarization result between planes to generate dot data by an error diffusion. As a similar technique for eliminating superposition of data between planes, algorithms disclosed in Japanese Patent Laid-Open No. H8-27920 and Japanese Patent Laid-Open No. 11-10918 are known. However, according to these techniques, elimination of superposition of binary data depends on a threshold value pattern of an error diffusion. That is, these techniques do not substantially use a weighting coefficient to control the degree of dispersion of a dot arrangement.

In the above embodiment, in an order of dot formation of the respective planes, the dot arrangement result of all planes previously formed is referred to determine the dot arrangement of the successive plane. However, only the dot arrangement result of a specific plane also may be referred as required. For example, when the dot arrangement of the plane C of the second pass is determined, only the result of planes for which the superposition should be avoided as much as possible (e.g., plane C for the first pass, planes M and Y for the second pass) may be considered and the other planes (planes M and Y for the first pass) may not be considered. Specifically, a case will be considered in which N×K types of pieces of multi-valued image data are sequentially subjected to an error diffusion in an order from the first one to the Nkth one so that the N×K types of pieces of multi-valued image data correspond to N scans (N is an integer of 2 or more) and K inks (K is an integer of 2 or more). In this case, Xth error diffusion may be performed based on the results of a number of error diffusions which is smaller than a number of (X−1) types of error diffusion, among the (X−1) types of error diffusion that have been executed as 1st to (X−1)th error diffusion.

Although the above embodiment determines a dot arrangement to which dot arrangements for all passes are associated, a dot arrangement is not required to be determined by associating dot arrangements for all passes and a dot arrangement for a specific pass may be associated. For example, only for planes of different colors for the first pass, the error diffusion process having the above-described characteristic may be executed. Alternatively, planes of a certain color may be selected and a specific pass of the selected planes may be associated. For example, between planes of inks of an identical color, the result of the error diffusion processing may be associated with one another as described above.

Although the above embodiment has described an example in which a dot arrangement of the respective planes is determined in an order of dot formation to unit areas, the same but smaller effect may be obtained even when this order is inverted. For example, when dots are formed in an order of C, M, and Y in the first pass, an error diffusion processing may be performed in an order of Y, M, and C so as to determine the dot arrangements of the respective planes. Further, the dot arrangement of Y, M, and C planes of the same pass may be simultaneously determined based on the method disclosed in Japanese Patent Laid-Open No. 8-279920.

As described above, according to the first embodiment of the present invention, dots of the respective planes are formed while being sufficiently dispersed. As a result, even when permeation of ink to a printing medium is not sufficient at the stage of an intermediate image in which an image is not yet completed depending on a relation between ink and a printing medium, a probability that insufficiently permeated inks have a contact to one another to form agglomerate is low. Thus, the so-called beading can be suppressed. Furthermore, even when the above agglomerate exists or beading is caused due to the agglomerate, these agglomerates are favorably dispersed and thus has a smaller influence on the quality of a printed image.

When it is considered that ink is not always required to be sufficiently permeated at the stage of an intermediate image, the printer 104 can have a shorter difference in the printing time between planes (i.e., difference in an ejection time). For example, a carriage speed or an ejection frequency can be increased or four passes in a multi-pass printing considering sufficient ink permeation also can be reduced to two passes to perform a printing.

The same structure as the above described also can be applied to a printing system using reactive ink for example that generates insoluble matter by the mixture of ink and colorless transparent liquid or inks. Specifically, a plane of binary data of reactive ink or liquid may be subjected to the same error diffusion processing as the above one to provide a favorable dot dispersion of superposed planes that has less low frequency components and that has a favorable dispersibility. As a result, a probability can be reduced at which, at the stage of an intermediate image, neighboring inks that insufficiently permeate unnecessarily react to one another to form an agglomerate of insoluble matter and, even when such agglomerate is formed, the agglomerate can be prevented from being conspicuous.

In the above described first embodiment, when image data corresponding to respective colors and respective scans is sequentially generated by binarization processes, successive binarization process is executed based on the result of precedent binarization process. Especially, the first embodiment employs an error diffusion process as the precedent binarization process and an error diffusion process as the successive binarization process. According to this aspect, dot arrangements that prevent the beading from occurring can be realized.

(Second Embodiment)

The above described first embodiment employs the same method of error diffusion for binarizing multi-valued data of all color planes obtained by a pass division. However, the present invention is not limited to this aspect. Different types of binarization method may be used for binarizing a plurality of planes. This aspect allows a combination of binarization methods to be made in consideration for the characteristics of the methods such as a computing speed and allows a process for generating quantized data to be appropriate one that is suitable for a desired purpose.

For example, the binarization for one plane of a certain color or certain pass may be performed by using a dither method and the binarization for another plane may be performed by using an error diffusion method. Thus, the dither method for which computing load is relatively small may be employed to specific planes so that throughput of computing is improved and computing load is made to be small.

A second embodiment of the present invention relates to an aspect that in generation of binary data of cyan (C), magenta (M) and yellow (Y) for two passes, a dither method is used for binarizing C data for first pass and then an error diffusion method is used for binarizing data of M and Y for the first pass and data of C, M and Y for a second pass.

FIG. 10 is a diagram showing an example of a dither pattern used in this embodiment. Through FIG. 10 shows the dither pattern of a size of 4 pixels×4 pixels for simplification of illustration and description, a size of the actually used pattern is greater than a size of 64 pixels×64 pixels=256 pixels and a threshold value of any of 0 to 255 is assigned.

Hereinafter, in an example, binarizing a divided multi-valued data D8c/2 of a first plan for C that is shown in FIG. 9A with use of the dither pattern shown in FIG. 10 will be described. If divided multi-valued data of C is data in which all pixels have the same pixel value of "100" and is binarized with a dither pattern having threshold values and arrangement thereof as shown in FIG. 10, the binary data shown in FIG. 9B is obtained. Accordingly, addition processes of correction terms and error diffusion processes after the binarization to the divided multi-valued data for the first plane are the same as the processes of the first embodiment shown in FIG. 9C to 9G.

More specifically, FIG. 9B shows binary data obtained by the above described dither process for the divided multi-valued data D8c1/2 of C. Next, FIG. 9C shows correction data generated by using the divided multi-valued data D8c/2 and binary data D2c1. Specifically, the multi-valued correction data is a difference obtained by subtracting, from the divided multi-valued data D8c/2 of FIG. 9A, the binary data D2c1 of FIG. 9B. Then, this correction data is added to divided multi-valued data D8m/2 of magenta (M). In this addition, Kc1m1 as a weighting coefficient for corrected data is used. When Kc1m1=1 is established, the correction data is directly added to the magenta divided multi-valued data. When Kc1m1=0.5 is established, the half of the value of the correction data is added to the magenta divided multi-valued data. In the shown example, Kc1m1=0.5 is established. FIG. 9D shows the correction data of the example. With the correction data shown in FIG. 9D, the magenta divided multi-valued data D8m/2 of the next plane shown in FIG. 9E is corrected. FIG. 9F shows the multi-valued data after correction which is represented as a sum of data shown in FIG. 9D and data shown in FIG. 9E.

Then, the corrected data shown in FIG. 9F is subjected to error diffusion and magenta binary data shown in FIG. 9G for the second plane is obtained. The generation of the subsequent third to sixth planes is similarly performed.

In the above described second embodiment, when image data corresponding to respective colors and respective scans is sequentially generated by binarization processes, successive binarization process is executed based on the result of precedent binarization process. Especially, the second embodiment employs a dither process for the first plane and error diffusion processes as the successive binarization processes. According to this aspect, dot arrangements that prevent the beading from occurring can be realized.

The above description is given wherein in the case that the divided multi-valued data shown in FIG. 9A is binarized by using the dither pattern, the binary data shown in FIG. 9B is obtained. However, it is a matter of course that binary data obtained is different depending on what a dither pattern is used. In the above description, for simplification of the description, the dither pattern shown in FIG. 10 is illustrated by an example as the pattern that can obtain the binary data shown in FIG. 9B.

A combination of precedent dither processes and successive dither processes is not limited to the above described combination. For example, dither processes are executed for all passes (planes) for cyan and error diffusion processes are executed for all passes (planes) for magenta and yellow. It is also desirable that a dither process or an error diffusion process is assigned for each color in this manner.

(Third Embodiment)

A third embodiment of the present invention relates to a configuration that binaryzation for all six planes shown in FIG. 8 are performed by dither processes. In the above described two embodiments, an example that a subsequent binarization is executed by an error diffusion based on the result of antecedent binarization by an error diffusion, and an example that successive binarizations are performed by an error diffusion based on the result of first binarization by a dither process are shown. The present embodiment shows that binarizations for all planes are performed by dither processes and in the binarizations, dither patterns are different for each plane. It is noted that the dither patterns may be the same for a part of the plural planes or for all planes. Use of dither processes for all planes as described above allows the binarization processes to have relatively less load of processing entirely and to have increased processing speed.

FIGS. 19A to 19G are diagrams for illustrating binarization processes according to the present embodiment, and are similar drawings to FIGS. 9A to 9G. Hereinafter, the binarization processes of the present embodiment will be described with reference to FIGS. 19A to 19G. Processing of the present embodiment is basically similar to the above described processing with reference to FIG. 8 and differs in that binarization is performed by dither processes for all planes.

FIG. 19A shows 8 bit of divided multi-valued data D8c/2 of cyan (C) that is shown in FIG. 8. In FIG. 19A, for simplification of description, all pixels that has pixel value "100" are shown. The present embodiment performs binarization for this first plane by using the dither pattern shown in FIG. 10. FIG. 19B shows binary data D2c1 that is obtained by performing a dither process for the divided multi-valued data D8c/2 by using the dither pattern shown in FIG. 10.

Next, FIG. 19C shows the correction data generated by using the divided multi-valued data D8c/2 and binary data D2c1. Specifically, the multi-valued correction data is a difference obtained by subtracting, from the divided multi-valued data D8c/2 of FIG. 19A, the binary data D2c1 of FIG. 19B. Then, this correction data is added to the divided multi-valued data D8m/2 of magenta (M). In this addition, Kc1m1 as a weighting coefficient for corrected data is used. When Kc1m1=1 is established, the correction data is directly added to the magenta divided multi-valued data. When Kc1m1=0.5 is established, the half of the value of the correction data is added to the magenta divided multi-valued data. In the shown example, Kc1m1=0.5 is established. FIG. 19D shows the correction data of the example.

Then, with the correction data shown in FIG. 19D, the magenta divided multi-valued data D8m/2 of the next plane shown in FIG. 19E is corrected. FIG. 19F shows the multi-valued data after correction that is represented as a sum of data shown in FIG. 19D and data shown in FIG. 19E.

Then, the corrected data shown in FIG. 19F is subjected to a binarization using the dither pattern shown in FIG. 18. FIG. 18 shows an example of the dither pattern used for binarization for a second plane. Although FIG. 18 shows the dither pattern of size of 4 pixels×4 pixels for illustration and simplification of description, the actual pattern has a size greater than 64 pixels×64 pixels, that is, 64×64=256 pixels, and each of pixels has a pixel value of any of 0 to 255.

FIG. 19G shows binary data of magenta for the second plane, which is obtained by using the dither pattern shown in FIG. 18.

In the above described third embodiment, when image data corresponding to respective colors and respective scans is sequentially generated by binarization processes, successive binarization process is performed based on the result of precedent binarization process. Especially, the third embodiment employs a dither process for the precedent plane and the also dither process as the subsequent binarization processes. According to this aspect, dot arrangements that prevent the beading from occurring can be realized.

(Other Embodiments)

In the above described first to third embodiments, when image data corresponding to respective colors and respective scans is sequentially generated by binarization processes, successive binarization process is executed based on the result of precedent binarization process. However, an application of the present invention is not limited to the binarization. The present invention may be applied to conversion processes into three-valued data, four-valued data and the like. In other words, the present invention may be applied to a conversion process into n-valued data (n value conversion processes). Thus, the present invention can be applied to a so called quantization process such as the n value conversion process. Accordingly, the present invention is featured that when image data corresponding to respective colors and respective scans is sequentially generated by n value conversion processes (quantization processes), each of which converts multi-valued data into n-valued data, successive n value conversion processes (quantization processes) is performed based on the result of precedent an n value conversion process (quantization process).

The n value conversion process may be an error diffusion process or a dither process. The error diffusion process or the dither process in the cases of n=2 is described in detail in the first to third embodiments but a error diffusion process or a dither process in the cases of n≧3 is not described. However, the error diffusion process or the dither process in the cases of n≧3 is known and thus description about these processes is omitted.

In the above embodiment, among the processes shown in FIG. 6, the data division of Steps S304 and S305 (pass division and binarization process) is performed by a printer driver operating in a personal computer. However, of course, the invention is not limited to this aspect. For example, a hardware such as ASIC in the image printing apparatus (printer 104 of FIG. 5) may be used to perform the above data division. For example, the printer 104 that can execute a series of image processing steps of FIG. 6 may include an exclusive ASIC for performing the image processing of FIG. 6 to perform data generation using the ASIC under the control of the CPU of the printer. In this case, the printer functions as an image processing apparatus (image data generation apparatus) for executing the image processing (pass division and error diffusion) as a characteristic of the present invention.

In the above embodiment, a case is described in which dot data of two passes is generated. The invention may be applied to any number of passes such as three passes and four passes. In this case, as described in the above embodiment, the generation of a plurality of planes in accordance with ink colors and the number of times of scanning may sequentially reflect the result of the plane processing on another plane.

Further, the present invention is featured that when image data corresponding to respective colors and respective scans is sequentially generated, the result of an n value conversion process for one plane is reflected on an n value conversion processes for another plane. In this case, four combinations of one plane and another plane exist.

That is, the combinations of one plane and another plane are a combination of planes of different colors and different passes, a combination of planes of different colors and same passes, a combination of planes of same colors and different passes, and a combination of planes of same colors and same passes, and the present invention may be applied to any combination among them.

For example, as one example of the combination of planes of different colors and different passes, it may be given that one plane is a plane of cyan for a first pass and another plane is a plane of magenta for a second pass. Also, as one example of the combination of planes of different colors and same passes, it may be given that one plane is a plane of cyan for a first pass and another plane is a plane of magenta for the first pass. Further, as one example of the combination of planes of same colors and different passes, it may be given that one plane is a plane of cyan for a first pass and another plane is a plane of cyan for a second pass. Finally, as one example of the combination of planes of same colors and same passes, it may be given that one plane is a plane of cyan for a first pass and another plane is a plane of cyan for the first pass. Only in case of the combination of planes of same colors and same passes, a printing head provided with a plurality of nozzle arrays of the same ink colors is needed. As such type of printing head, a symmetry type printing head is given in which nozzle arrays of cyan, magenta, yellow, magenta and cyan is arranged in this order along the scanning direction of the head. In the case of using the symmetry type printing head, image data to be printed by plural nozzle arrays of cyan or plural nozzle arrays of magenta is generated by the above described binarization. Thus, the present invention can be applied to the combination of planes of same colors and same passes.

Furthermore, although the above embodiments have described examples in which C, M, and Y inks are used to perform a multi-pass printing, the invention also can be applied to the generation of the dot data of a plurality of planes depending on the number of scans in the multi-pass printing using one color of ink. The invention also can be applied to data generation when a single printing head reciprocates in a unit area to perform a printing.

The present invention is put into practice by executing program codes of software such as steps S304, S305 in a flowchart shown in FIG. 6, for example, which implements the functions of the above described embodiments, or by a storage medium storing such program codes. Further, the present invention is also put into practice by that the computer (CPU or MPU) of the system or apparatus reads the program codes to execute them. In this case, the program codes of the software themselves implement the functions of the above described embodiments, so that the storage medium storing the program codes constitute the present invention.

The storage medium storing such program codes may be, for example, a floppy disk, a hard disk, an optical disk, a magneto-optical disk, a CD-ROM, a magnetic tape, a non-volatile memory card, or a ROM.

In addition, if the functions of the above described embodiments are implemented not only by the computer by executing the supplied program codes but also through cooperation between the program codes and an OS (Operating System) running in the computer, another application software, or the like, then these program codes are of course embraced in the embodiments of the present invention.

Furthermore, a case is of course embraced in the present invention, where after the supplied program codes have been stored in a memory provided in an expanded board in the computer or an expanded unit connected to the computer, a CPU or the like provided in the expanded board or expanded unit executes part or all of the actual process based on instructions in the program codes, thereby implementing the functions of the above described embodiments.

This application is a continuation application of PCT application No. PCT/JP2007/066670 under 37 Code of Federal Regulations §1.53 (b) and the said PCT application claims the benefit of Japanese Patent Application No. 2006-231152, filed Aug. 28, 2006, which is hereby incorporated by reference herein in its entirety.

The invention claimed is:

1. An image data generating apparatus that generates image data used for printing an image on a unit area of a printing medium by a plurality of scans of a printing head, said apparatus comprising:
   an obtaining unit configured to obtain a plurality of M-valued image data corresponding respectively to one scan and another scan of the plurality of scans, where M is an integer; and
   a generating unit configured to generate first n-valued image data representing a gradation value of n values, where n is an integer less than M, corresponding to the one scan by executing an M value-to n value conversion process on M-valued image data corresponding to the one scan obtained by the obtaining unit, and generate second n-valued image data corresponding to the another scan by executing an M value-to n value conversion process on M-valued image data, the M-valued image data being data that is obtained by correcting a gradation value of a pixel in the unit area for the another scan on the basis of an n value of the pixel of the first n-valued image data.

2. An image data generating apparatus as claimed in claim 1, wherein the printing head ejects inks of plural colors, and the obtaining unit obtains a plurality of M-valued image data corresponding to each of the plurality of scans for printing the image of a same color, the first n-valued image data and the second n-valued image data corresponding to the same color.

3. An image data generating apparatus as claimed in claim 2, wherein the generating unit sequentially executes the processes to respective M-valued image data of the plural colors, which correspond to respective colors of inks, in an ejecting order of the inks to the unit area.

4. An image data generating apparatus as claimed in claim 1, wherein the printing head ejects inks of plural colors, and the obtaining unit obtains a plurality of M-valued image data corresponding to the plurality of scans, for each of different colors, the first n-valued image data and the second n-valued image data corresponding to the different colors.

5. An image data generating apparatus as claimed in claim 4, wherein
   in a case that a number of the plurality of scans is N, where N is an integer greater than 2, and a number of the plural colors of inks is K, where K is an integer greater than 2, the generating unit sequentially executes first to NKth M value-to n value conversion processes on N×K types of the plurality of M-valued image data, and
   the Xth (1<X≦NK) M value-to n value conversion process as the subsequent M value-to n value conversion process is executed based on a result of (X−1) types of precedent M value-to n value conversion processes as the first to (X−1)th M value-to n value conversion processes.

6. An image data generating apparatus as claimed in claim 4, wherein
   in a case that a number of the plurality of scans is N, where N is an integer greater than 2, and a number of the plural colors of inks is K, where K is an integer greater than 2, the generating unit sequentially executes first to NKth M value-to n value conversion processes on N×K types of the plurality of M-valued image data, and
   the Xth (1<X≦NK) M value-to n value conversion process as the M value-to n value conversion process is executed based on a result of precedent M value-to n value conversion processes of types smaller than (X−1) types of precedent M value-to n value conversion processes as the first to (X−1)th M value-to n value conversion processes.

7. An image data generating apparatus as claimed in claim 1, wherein the generating unit executes the M value-to n value conversion process based on results of the M value-to n value conversion process, so that a probability at which ink ejection positions indicated by the first n-valued image data are identical with ink ejection positions indicated by the second n-valued image data is lower than a probability at which the ink ejection positions indicated by the first n-valued image data are identical with ink non-ejection positions indicated by the second n-valued image data.

8. An image data generating apparatus as claimed in claim 1, further comprising a correcting unit configured to correct the M-valued image data corresponding to the another scan so as to decrease an M value of a pixel in the unit area, the pixel indicating printing the pixel in the first n-valued image data.

9. An image data generating apparatus as claimed in claim 1, wherein the M value-to n value conversion process is an error diffusion process.

10. An image data generating method for generating image data used for printing an image on a unit area of a printing medium by a plurality of scans of a printing head, said method comprising:
    an obtaining step of obtaining a plurality of M-valued image data corresponding respectively to one scan and another scan of the plurality of scans; and
    a generating step of generating first n-valued image data representing a gradation value of n values, where n is an integer less than M, corresponding to the one scan by executing an M value-to n value conversion process on M-valued image data corresponding to the one scan obtained by the obtaining step, and generating second n-valued image data corresponding to the another scan by executing an M value-to n value conversion process on M-valued image data, the M-valued image data being data that is obtained by correcting a gradation value of a pixel in the unit area for the another scan on the basis of an n value of the pixel of the first n-valued image data.

11. An image data generating method as claimed in claim 10, wherein the printing head ejects inks of plural colors, and the obtaining step obtains a plurality of M-valued image data corresponding to each of the plurality of scans for printing the image of a same color, the first n-valued image data and the second n-valued image data corresponding to the same color.

12. An image data generating method as claimed in claim 10, wherein the printing head ejects inks of plural colors, and the obtaining step obtains a plurality of M-valued image data corresponding to the plurality of scans, for each of different colors, the first n-valued image data and the second n-valued image data corresponding to the different colors.

13. An image data generating method as claimed in claim 10, wherein the generating step sequentially executes the processes to respective M-valued image data of plural colors, which correspond to respective colors of inks, in an ejecting order of the inks to the unit area.

14. An image data generating method as claimed in claim 10, wherein the generating step executes the M value-to n value conversion process based on results of the M value-to n value conversion process, so that a probability at which ink ejection positions indicated by the first n-valued image data are identical with ink ejection positions indicated by the second n-valued image data is lower than a probability at which the ink ejection positions indicated by the first n-valued image data are identical with ink non-ejection positions indicated by the second n-valued image data.

15. An image data generating method as claimed in claim 10, further comprising a correcting step for correcting the M-valued image data corresponding to the another scan so as to decrease an M value of a pixel in the unit area, the pixel indicating printing the pixel in the first n-valued image data.

16. An image data generating method as claimed in claim 10, wherein the M value-to n value conversion process is an error diffusion process.

17. An image data generating apparatus that generates image data used for printing an image on a unit area of a printing medium by a plurality of scans of a printing head, said apparatus comprising:

an obtaining unit configured to obtain a plurality of M-valued image data corresponding respectively to one scan of the plurality of scans of a first color and a second color of a plurality of colors, where M is an integer; and a generating unit configured to generate first n-valued image data representing a gradation value of n values, where n is an integer less than M, corresponding to the one scan of the first color by executing an M value-to n value conversion process on M-valued image data corresponding to the one scan of the first color obtained by the obtaining unit, and generate second n-valued image data corresponding to the one scan of the second color by executing an M value-to n value conversion process on M-valued image data, the M-valued image data being data that is obtained by correcting a gradation value of a pixel of the second color in the unit area on the basis of an n value of the pixel of the first color in the first n-valued image data.

* * * * *